United States Patent [19]

Saeki et al.

[11] Patent Number: 5,122,645
[45] Date of Patent: Jun. 16, 1992

[54] METHOD AND APPARATUS FOR READING BAR CODES ON PHOTOGRAPHIC FILM AND DETERMINING SETTING CONDITIONS OF PHOTOGRAPHIC FILM

[75] Inventors: Yoshihiko Saeki; Yoichi Ujiie; Syuji Tahara; Kanji Tokuda, all of Kanagawa, Japan

[73] Assignee: Fuji Photo Film Co., Ltd., Kanagawa, Japan

[21] Appl. No.: 315,673

[22] Filed: Feb. 27, 1989

[30] Foreign Application Priority Data

Feb. 27, 1988 [JP] Japan ................................. 63-45564
Mar. 18, 1988 [JP] Japan ................................. 63-65339
Aug. 8, 1988 [JP] Japan ................................ 63-197762

[51] Int. Cl.$^5$ ...................... G06K 7/10; G03B 27/32; G03B 23/12
[52] U.S. Cl. ................................. 235/462; 235/375; 235/466; 235/475; 355/41; 355/77; 353/26 A
[58] Field of Search ............... 235/375, 376, 454, 469, 235/462, 475, 476, 440, 456; 250/571, 566, 568, 570; 353/26 R, 26 A, 27 R, 27 A; 355/38–41, 77

[56] References Cited

U.S. PATENT DOCUMENTS

| | | | |
|---|---|---|---|
| 3,761,685 | 9/1973 | Alpert et al. | 235/463 |
| 3,898,002 | 8/1975 | Kinder et al. | 355/40 |
| 4,207,473 | 6/1980 | Nakatani et al. | 250/570 |
| 4,369,372 | 1/1983 | Yoshioka et al. | 250/208.1 |
| 4,514,641 | 4/1985 | Tanaka et al. | 250/570 |
| 4,555,632 | 11/1985 | Vockenhuber | 250/560 |
| 4,638,170 | 1/1987 | Kubota | 250/566 |
| 4,656,343 | 4/1987 | Gerritsen et al. | 235/454 |
| 4,691,112 | 9/1987 | Wydler | 250/570 |
| 4,716,438 | 12/1987 | Farrell | 355/201 |
| 4,727,399 | 2/1988 | Matsumoto | 250/571 |
| 4,792,670 | 12/1988 | Fukaya et al. | 250/211 R |
| 4,797,713 | 1/1989 | Terashita et al. | 355/38 |
| 4,806,990 | 2/1989 | Tahara | 355/75 |
| 4,825,387 | 4/1989 | Ono | 355/40 |
| 4,906,854 | 3/1990 | Rauh et al. | 250/570 |
| 4,914,471 | 4/1990 | Saeki et al. | 355/41 |
| 4,918,484 | 4/1990 | Ujiie et al. | 355/77 |

FOREIGN PATENT DOCUMENTS

| | | |
|---|---|---|
| 105507 | 4/1984 | European Pat. Off. |
| 2162566 | 5/1973 | Fed. Rep. of Germany |
| 2614965 | 10/1977 | Fed. Rep. of Germany ....... 355/41 |
| 3509938 | 9/1985 | Fed. Rep. of Germany |

*Primary Examiner*—Stuart S. Levy
*Assistant Examiner*—Edward H. Sikorski
*Attorney, Agent, or Firm*—Sughrue, Mion, Zinn, Macpeak & Seas

[57] ABSTRACT

Two bar code sensors are disposed at opposite sides of a passage of a photographic film, each bar code sensor having two photosensors disposed along a line perpendicular to the transportation direction of the photographic film. Each time a photographic film is fed by a predetermined distance, signals outputted from the two bar code sensor units are sampled and are compared with the signals obtained at the second preceding sampling timing to convert them into binary signals. Based on the data configuration of binary signals, i.e., based on the discrimination between the start code and end code, or the presence or absence of a clock track, automatic discrimination is performed between DX bar code data and frame number bar code data which then are decoded into a film type and frame number, respectively. The setting conditions of a photographic film also can be determined based on the bar code data configuration. An alarm is output if the setting conditions are not normal. The feed amount of a read-out frame number code is measured to calculate the number of a frame set at the print stage. Reading a frame number bar code may be performed synchronously with reading the DX bar code clock track.

7 Claims, 19 Drawing Sheets

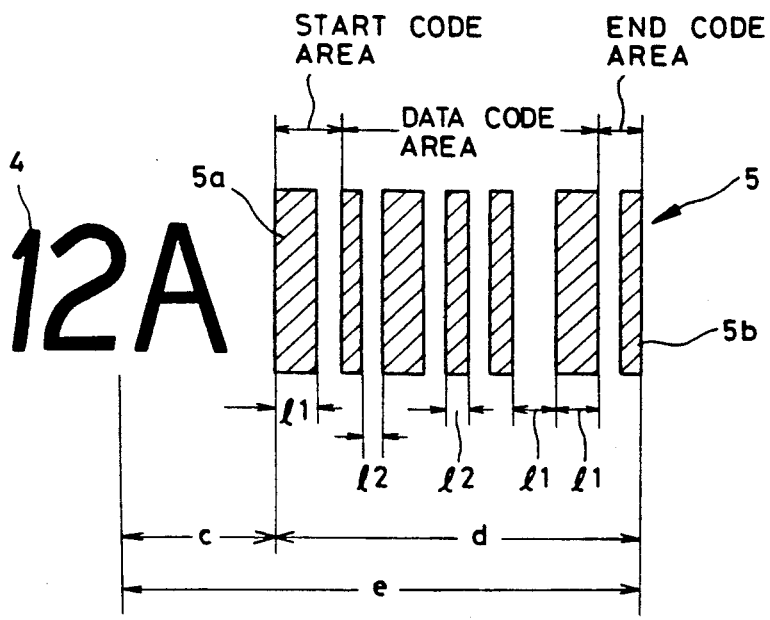
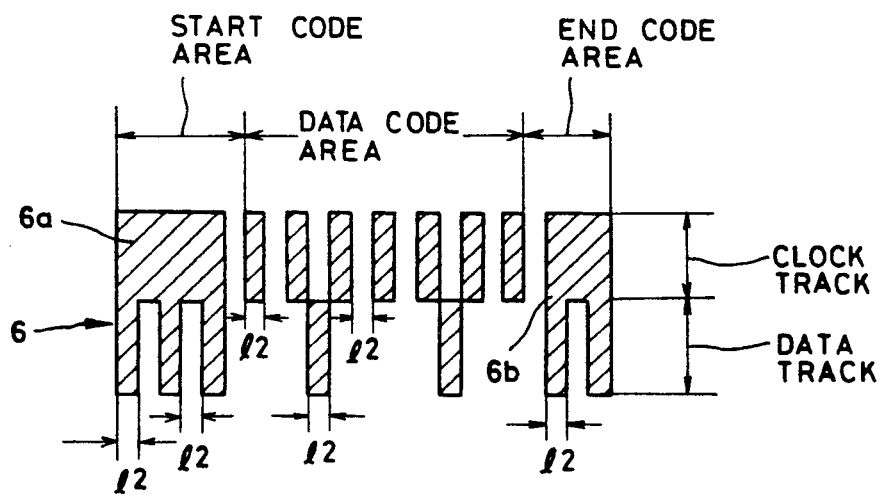

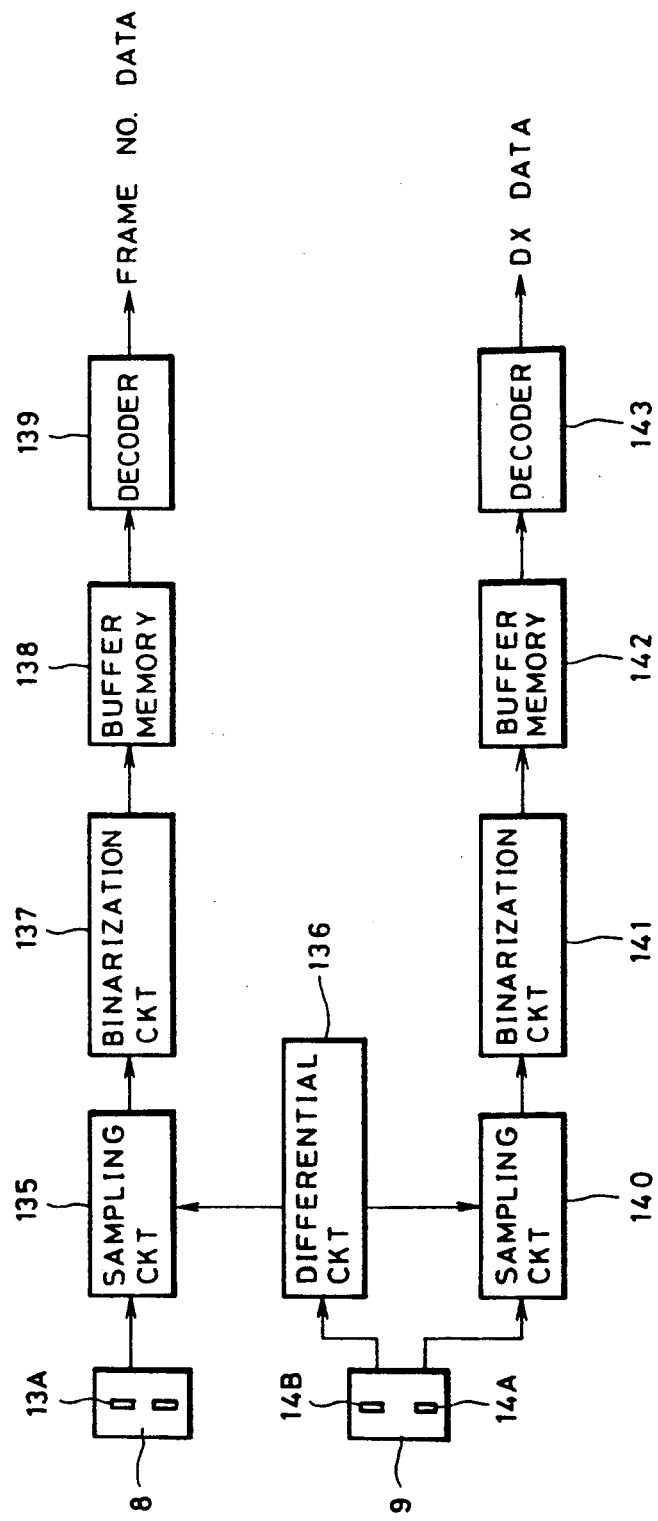

METHOD AND APPARATUS FOR READING BAR CODES ON PHOTOGRAPHIC FILM AND DETERMINING SETTING CONDITIONS OF PHOTOGRAPHIC FILM

BACKGROUND OF THE INVENTION

The present invention relates to a method and apparatus for reading DX bar codes and frame number bar codes printed on edges of photographic film and to a method of determining conditions for setting the photographic film on a film carrier based on the reading of such bar codes.

DX bar codes representative of a film type (maker and film sensitivity) are printed as a latent image on an edge portion of a negative film, e.g. of 135 type, the DX bar codes being made visible upon development. The DX bar code is constructed of a clock track used for reading timings, and a data track on which data are recorded, both tracks being printed on opposed major edges of the negative film. The DX bar code is read with a bar code sensor unit at the time of printing or at the time of inspecting the quality (color balance and density) of the frame image. The read-out data are used in calculating the exposure amount for printing.

It also is known that a bar code representation of a frame number is printed along an edge of a photographic film. The frame number bar code is used. e.g.. for searching for a desired frame to obtain additional prints thereof and automatically setting it at the print stage of a printer for recording a frame number on some area of the print to dispense with the comparison work between a print and the frame, and for other reasons.

Printing both DX bar codes and frame number bar codes along edges of a photographic film necessitates use of different types of bar codes to allow discrimination therebetween. Moreover, it becomes necessary to use two bar code sensor units, each dedicated to one of the two types of bar codes and mounted on a film carrier at both sides of a film passage. However, it is necessary to set the film on the film carrier in one of two predetermined directions, with either the smallest or the largest frame number at the start position. If a film is set in the wrong direction, neither of the bar codes can be read correctly. Also, if a film is set upside down in the film carrier the bar codes cannot be read correctly, and a photograph printed from the rear side is produced, resulting in loss of material and work time.

Even if a read error occurs for one of the DX bar codes, the following DX bar code which is edge-printed at equal intervals on the film may be read, thus posing no problem. However, only one frame number bar code is present for each particular frame, so that if the bar code sensor unit erroneously reads the frame number, the incorrectly read frame number when set at the print stage cannot be identified.

SUMMARY OF THE INVENTION

It is a principal object of the present invention to provide a bar code reading apparatus capable of reading both DX bar codes and frame number bar codes, regardless of the direction of a photographic film set at the film carrier.

It is another object of the present invention to provide a bar code reading apparatus for photographic film capable of identifying the number of a frame positioned at the print stage, even if a read error occurs, based on the read-out frame number bar code of the preceding frame.

It is a further object of the present invention to provide a method of determining the setting condition of a photographic film based on the position and direction of a read-out bar code.

It is a still further object of the present invention to provide a method of readily reading a frame number bar code by using the clock track of a DX bar code.

The above and other objects, features, and advantages of the present invention are achieved by the following. Two bar code sensor units are disposed at either side of a photographic film passage. Each of the bar code sensor units has two photosensors disposed perpendicularly to the photographic film feed direction. Each time a photographic film is fed by a constant amount, two signals outputted from each bar code sensor unit are sampled to read the DX bar code and frame number bar code printed at opposite sides of the photographic film. The setting conditions (film direction and film side) of a photographic film on a film carrier can be recognized based on the read-out data. Use of the clock track of a DX bar code makes it easy to read a frame number bar code.

The two bar code sensor units have the same construction so that each bar code sensor unit can read both the DX bar code and frame number bar code. The ability of each bar code sensor unit to read two types of data enables automatic discrimination between the DX bar code and frame number bar code. The discriminated DX bar code is decoded as a film type, and the discriminated frame number bar code is decoded as a frame number. By checking the positions of the DX bar code and frame number bar code and checking if the reading has started from the start code or from the end code, it is possible to recognize the conditions in which a photographic film has been set on a film carrier.

The sampling is carried out each time a photographic film is fed by a predetermined amount. The sampling is carried out synchronously with the drive pulses of a pulse motor by which a photographic film is caused to move, or with the drive pulses as frequency divided or multiplied by an integer. The sampling may be carried out synchronously with pulses outputted from a rotary encoder mounted on a free roller simultaneously rotating with a motion of a photographic film.

The bar code sensor units are positioned remotely from a center of a film mask so that the read-out frame number is not that of a frame set at the film mask. In order to obtain the frame number of a frame set at the film mask, there are provided feed amount measuring means and calculating means. The feed amount measuring means measures the feed amount of a read-out frame number bar code from the mounting position of the bar code sensor unit. The calculating means obtains the distance between the read-out frame number bar code and the center of the film mask based on the obtained feed amount and calculates the frame number of a frame set at the film mask by dividing the obtained distance by a pitch of frame number bar codes. Since frame numbers are printed at the side of each frame number bar code and spaced apart therefrom by a predetermined distance, the feed amount of a frame number and the pitch of frame numbers may be used in a similar manner in determining the frame number of a frame set at the film mask.

The feed amount measuring means includes a perforation sensor for detecting the perforations of a photographic film, a perforation counter for counting output signals from the perforation sensor, and a pulse counter for counting the drive pulses of a pulse motor by which a photographic film is caused to move, the pulse count being reset synchronously with each count of a perforation by the perforation counter. It is preferable to measure the feed amount of a frame number bar code based on the number of perforations and drive pulses thus counted. Pulses outputted from a rotary encoder simultaneously rotating with a motion of a photographic film obviously may be used instead of the drive pulses.

According to the present invention, two bar code sensor units each having two photosensors are disposed respectively at opposite sides of a photographic film passage, and the signals from the bar code sensor units are sampled each time a photographic film is fed by a constant distance. Therefore, it is possible to read both the DX bar code and the frame number bar code irrespective of the direction and side (back and front) of a photographic film. Based on the read-out data the direction and side of a photographic film can be determined, and if a photographic film is set upside down, an alarm display is output or a print operation is stopped.

The feed amount of a newest frame number bar code or corresponding frame number is measured to calculate a distance to the film mask. The calculated distance is divided by the pitch of the frame number bar codes to obtain the number of frame number bar codes. The obtained number is added to or subtracted from the read-out frame number to identify the frame number of a frame set at the print mask. Therefore, even if a read error occurs, a previously stored read-out frame number bar code is used to identify the frame number now concerned.

BRIEF DESCRIPTION OF THE DRAWINGS

The objects and advantages of the present invention will become more apparent from the following detailed description, taken in connection with the accompanying drawings in which:

FIGS. 2A and 2B show examples of patterns of a frame number bar code and a DX bar code, respectively, printed on the photographic film shown in FIG. 1;

FIG. 19 is a block diagram showing an electrical circuit used with the reading method shown in FIG. 18.

DETAILED DESCRIPTION OF THE PREFERRED EMBODIMENTS

Figure 1:
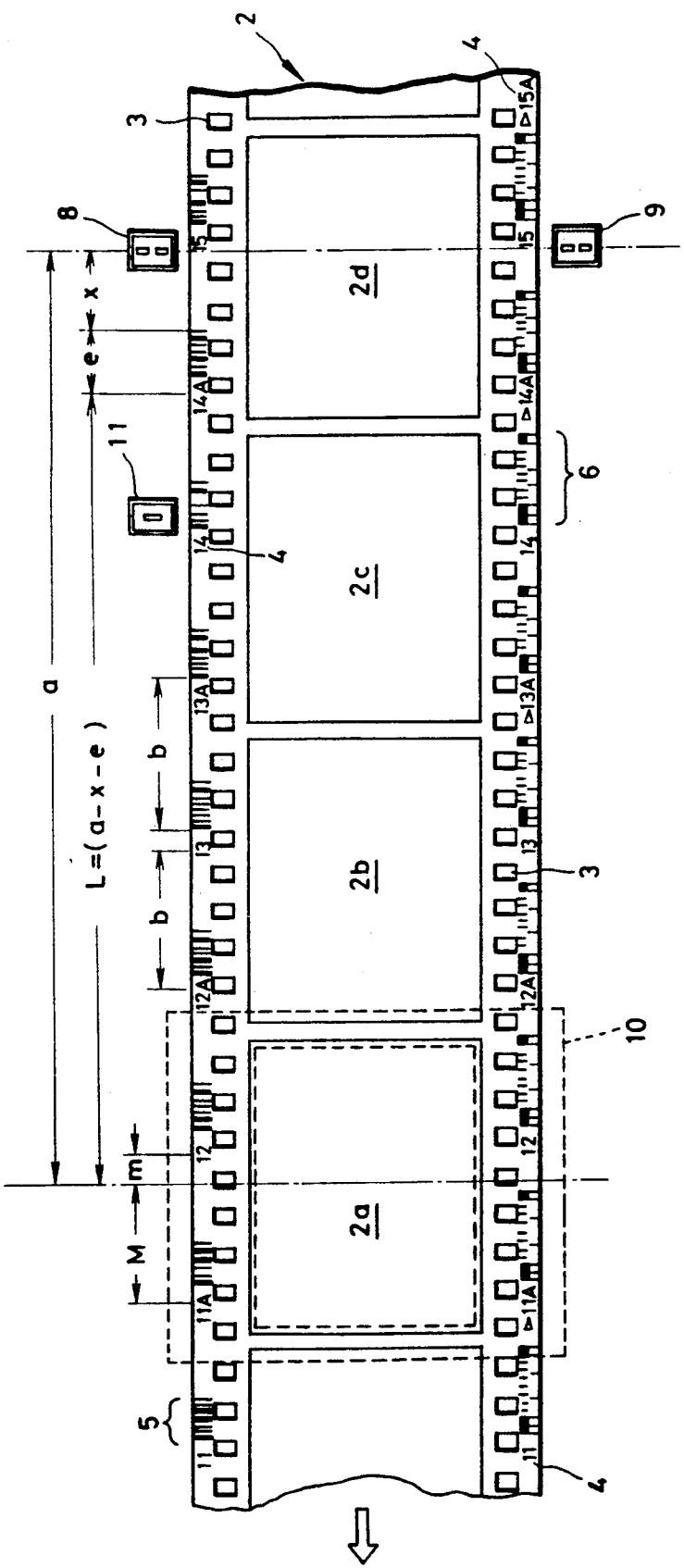
FIG. 1 shows a relationship of distance between bar code sensor units and a film mask according to a embodiment of this invention.

FIG. 1 shows a relationship of distances among a film mask and sensor units, as viewed from the light source. A photographic film 2. e.g. a 135 type roll negative film, has a plurality of frames 2a to 2d printed thereon and perforations 3 along both side edges thereof. At an intermediate position between the film edges and the perforations 3, frame numbers 4 and frame number bar codes 5 are printed on one side portion, and DX bar codes 6 are printed on the other side portion. The frame numbers 4 and frame number bar codes 5 are disposed at an equal pitch "b". The DX bar codes 6 also are disposed at the pitch "b". The bar codes 5 and 6 and frame numbers 4 are recorded as latent images which are made visible after photographic development.

Two bar code sensor units 8 and 9 are mounted at both side portions of a passage of the photographic film 2 to perform contact transmission type reading. The bar code sensor units 8 and 9 have the same structure, so that each of the bar code sensor units 8 and 9 can read both the frame number bar code 5 and DX bar code 6. The bar code sensor units 8 and 9 are disposed remotely from the center of a film mask 10 at the print position (print stage), by a distance "a". A perforation unit 11 is mounted above the passage of perforations 3 to optically detect them. A light projecting unit (not shown) made of. e.g.. LEDs, is disposed facing each sensor unit 8, 9, 11, with the photographic film 2 being interposed therebetween.

FIGS. 2A and 2B show examples of patterns of the DX and frame number bar codes. As the frame number bar code 5, various types of conventional bar codes can be used. In this embodiment, a three of nine code is used. The bar code has bars and spaces alternately disposed side by side. The bar or space with a larger width $l_1$ represents a binary code "1", whereas the bar or space with a smaller width $l_2$ ($l_1/2$) represents a binary code "0". Five data bars are recorded within the data code area, and the start and end code areas are provided at the opposite sides of the data code area to distinguish between the highest bit and lowest bit of the bar code data. A wider start bar 5a is recorded in the start code area, whereas a narrower end bar 5b is recorded in the end code area. The distance between the edge of the start bar 5a and the center of the frame number 4 is a constant value, "c". The total length of the data, start code and end code areas is a constant value "d". The total length of "c" and "d" is represented by "e".

Since three of nine code is not a binary code, the lowest bit does not signify whether a decimal number thereof is an odd number or an even number. The frame number bar code shown in FIG. 2A represents "1000100001100", so that a code "001000011" is recorded in the data code area, which corresponds to the decimal number "26" and the frame number "12A". The frame number bar code (represented herein by decimal notation for convenience) corresponds on a one-to-one basis to the frame number, as shown in Table 1. Instead of "S", "0" is used in certain types of photographic film.

TABLE 1

| Frame Number Bar Code (Decimal) | Frame Number |
| --- | --- |
| 1 | S |
| 2 | SA |
| 3 | 1 |
| 4 | 1A |
| 5 | 2 |
| 6 | 2A |
| . | . |
| . | . |
| . | . |
| 24 | 11A |
| 25 | 12 |
| 26 | 12A |
| . | . |
| . | . |
| . | . |
| 74 | 36A |
| . | . |
| . | . |

The DX code 6 is constructed of a clock track and a data track. Seven clock bars are recorded at a constant pitch ($2 \times l_2$) in the clock track, whereas data bars representative of a film type are recorded in the data track. At the opposite sides of the data code area, start code and end code areas are provided. A start pattern 6a is recorded in the start code area, and an end pattern 6b is recorded in the end code area. The DX bar code 6 has bars and spaces each having the same width $l_2$ which is the same as the narrower width of the frame number bar code 5.

Figure 3:
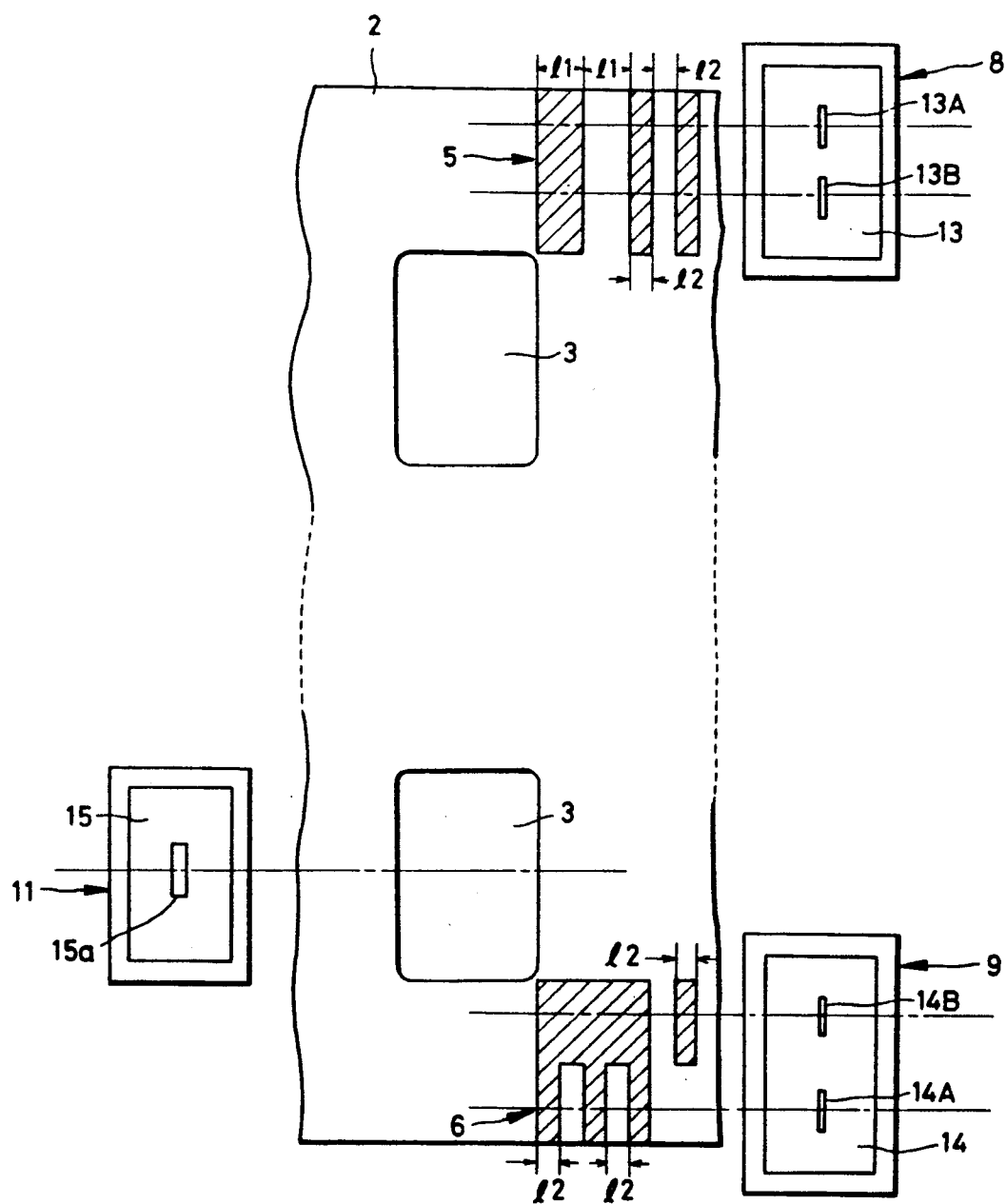
FIG. 3 illustrates a relationship between the bar code sensor units and bar codes

FIG. 3 shows a relationship of positions of the bar codes and the bar code sensor units. The bar code sensor unit 8, 9 has at its bottom face an amorphous silicon substrate 13, 14 which requires no wire bonding for a sensor, thus allowing a compact size and contact transmission type reading for bar codes. An amplifier is also included in the bar code sensor units 8, 9.

Two photosensors 13A and 13B are fabricated on the amorphous silicon substrate 13. The photosensor 13A corresponds in position to the passage of the data track of the DX bar code 6, and the photosensor 13B corresponds in position to the clock track of the DX bar code 6. The amorphous silicon substrate 14 has the same structure as that of the amorphous silicon substrate 13, with the photosensor 14A corresponding in position to the data track of the DX bar code 6, and the photosensor 14B corresponding in position to the clock track of the DX bar code 6. The perforation sensor unit 11 has also an amorphous silicon substrate 15 on which a photosensor 15a is fabricated facing the passage of the perforations 3.

Figure 4:
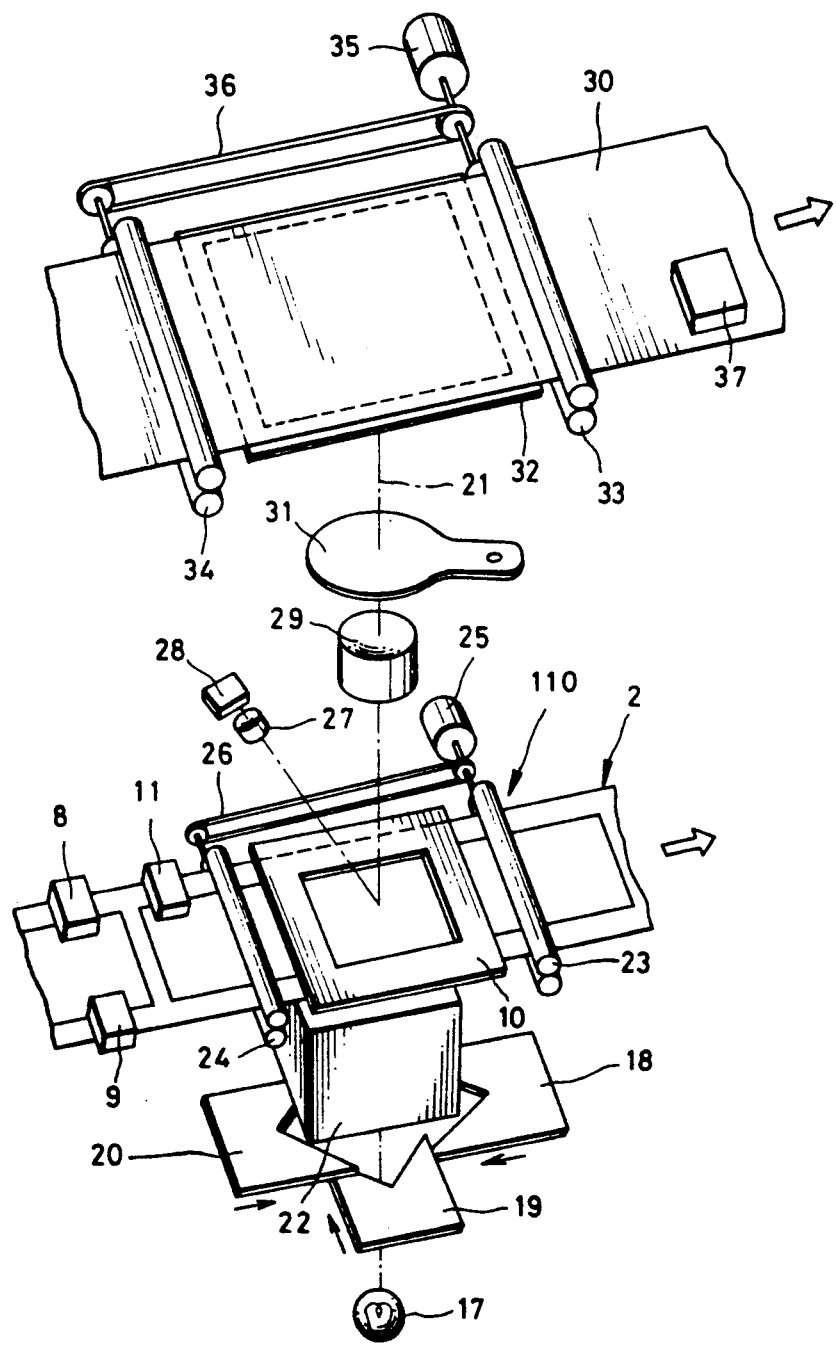
FIG. 4 is a schematic diagram showing a photographic printer used with the bar code sensors shown in FIG. 1.

FIG. 4 shows a photographic printer provided with the sensor units shown in FIG. 1. A yellow filter 18, magenta filter 19, and cyan filter 20 are mounted above a light source 17. These color correction filters 18 to 20 are moved in a plane perpendicular to the print optical path 21, and are adjustably inserted in the print optical path 21 in accordance with each color exposure amount, to adjust the intensity of the three color components of a print light.

A print light passed through the color correction filters 18 to 20 is sufficiently diffused within a mixing box 22 which has diffusion plates mounted at opposite ends of a rectangular tube whose inside constitutes a mirror face. A film carrier 110 (shown in greater detail in FIG. 8) is mounted above the mixing box 22 to set the photographic film 2 at the film carrier 110. A film mask 10 is mounted at the print stage of the film carrier 110, and feed roller pairs 23 and 24 operatively interconnected via a belt 26 are disposed at opposite sides of the film mask. The roller pair 23 is coupled to a pulse motor 25. The photographic film 2 is nipped with the feed roller pairs 23 and 24 and fed, in the direction shown by an arrow, one frame after another, so that a frame to be printed is positioned at the print stage.

A lens 27 and a sensor 28 are provided to measure the image within the frame set at the print stage. A print lens 29 is disposed above the print stage to enlarge the image within the frame set at the print stage and focus it onto a color paper 30. A shutter 31 and a paper mask 32 are disposed between the print lens 29 and the color paper 30. At opposite sides of the paper mask 32, two roller pairs 33 and 34 are mounted to nip and move the color paper one frame after another. The roller pair 33 is coupled to a pulse motor 35 whose rotation is transmitted via a belt 36 to the other roller pair 34.

A character printer 37 is disposed at the side of the paper mask 32 to print the printed frame number which is obtained based on the frame number bar code 5 which is read with one of the bar code sensor units 8 and 9, on the back of the exposed color paper 30, for example in the form of a dot pattern. Instead of the character printer 37, a paper mask print device constructed of a liquid crystal panel or a light emitting diode array may be mounted on the paper mask to print the frame number dot pattern simultaneously with the photographic printing. Alternatively, a dedicated character printer and a magnetic floppy disk or the like storing the printed frame numbers may be used. In this case, the magnetic floppy disk and the developed roll of color paper are set at the dedicated character printer to print the frame number and thereafter the color paper is cut into respective prints.

Figure 5:
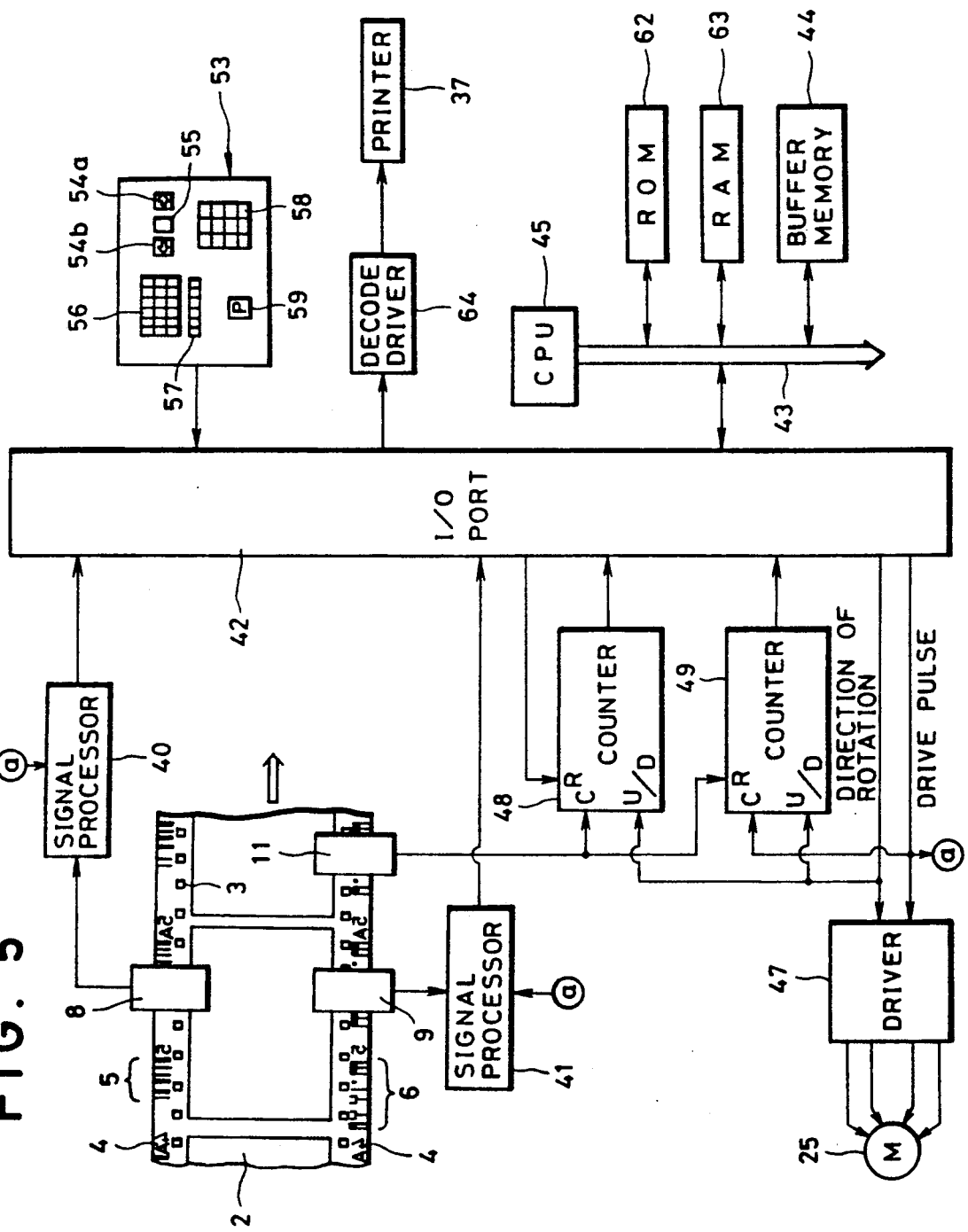
FIG. 5 is a block diagram of an electrical circuit of the photographic printer.

FIG. 5 shows a control circuit of the photographic printer. Signal processing circuits 40 and 41 are connected to the bar code sensor units 8 and 9. Signals outputted from the signal processing units 40 and 41 are processed synchronously with the drive pulses for the pulse motor 25 to output signals representative of the measured result. As described later in detail, two binary signals (1, 0) from the photosensor unit may be judged as black, two binary signals (0, 1) may be judged as white, and two binary signals (0, 0) may be judged as the same (black or white) as the preceding one. However, in this embodiment, the output signal from the photosensor, which is sufficiently stable, is used for discrimination between black and white. Since the two binary signals (1, 0) or (0, 1) represent that the output signal from the optical sensor is not still stable with relatively rapid change between two sampling timings, the two binary signals (0, 0) are judged as being for white and black, respectively corresponding to the bar and space (film base). CPU 45 samples the binary signals outputted from the signal processing circuits 40 and 41. These signals are sent via an I/O port 42 and bus line 43 to the buffer memory 44. The data stored in the buffer memory 44 are read into CPU 45 to judge the type of bar code and to convert the bar code into bar code data.

CPU 45 sends a signal representative of rotation direction of the pulse motor 25 and drive pulses through the bus line 43 and I/O port 42 to the driver 47, to control the rotation of the pulse motor 25 for moving the photographic film 2. The signal representative of the rotation direction also is inputted to the up/down terminals of a perforation counter 48 and a pulse counter 49. The perforation counter 48 counts up or down the signals outputted from the perforation sensor unit 11, in accordance with the rotation direction of the pulse motor 25, to measure the feed amount of the photographic film 2. The perforation counter 48 is reset by CPU 45 when the photographic film is set at the film carrier.

The perforation counter 48 measures the feed amount of the photographic film 2 in units of the pitch of the perforations 3, resulting in a coarse measurement of the feed amount. In this connection, the pulse motor causes the photographic film 2 to move by one pitch of the perforations 3 using, e.g., 20 drive pulses or steps. Therefore, the feed amount of the photographic film 2 can be measured more precisely by checking the number of drive pulses. In this embodiment, the count of the perforation counter 48 and the count of the pulse counter 49 which counts the drive pulses are used to perform precise, or fine measurement of the feed amount of the photographic film 2. The pulse counter 49 which measures the feed amount of the photographic film 2 within one pitch of the perforations 3 is reset in response to an output signal from the perforation sensor unit 11.

A keyboard 53 is provided with fine adjustment keys 54a and 54b for finely adjusting the position of the photographic film, a pass key 55 for passing one frame, color correction keys 56, density correction keys 57, alphanumeric keys 58 for data input, and a print key 59 for starting printing. ROM 62 stores therein programs for a bar code reading sequence, various control sequences and the like. Reference numeral 64 represents a decode driver for driving a character printer 37.

Figure 6:
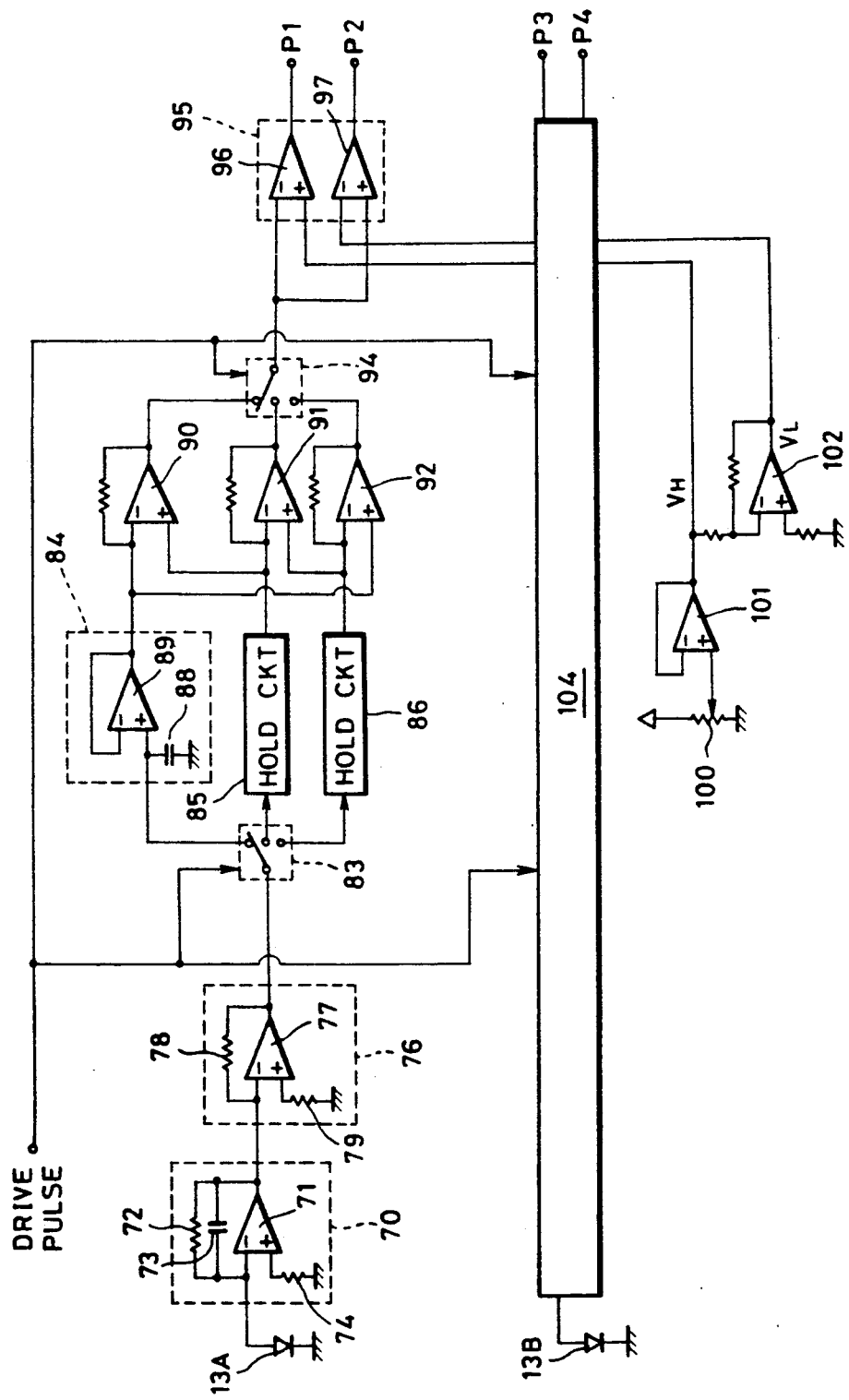
FIG. 6 is a circuit diagram showing an example of the signal processing circuit.

FIG. 6 shows an example of an analog type signal processing circuit 40. The photosensor 13A is connected to a current/voltage converter 70 in which a photocurrent is converted into a voltage. An output signal from the current/voltage converter 70 is supplied to and amplified by an amplifier 76 constructed of an operational amplifier 77 and resistors 78 and 79. An output of the amplifier 76 is held at one of hold circuits 84 to 86 upon selection by a demultiplexer 83 which is driven in response to a trailing edge of the drive pulse for the pulse motor 25. Each of the hold circuits 84 to 86 for holding a signal is constructed of a capacitor 88 and an operational amplifier 89. The output signals from the hold circuits 84 and 85 are inputted to a differential amplifier 90 to calculate a difference therebetween. The output signals from the hold circuits 85 and 86 are inputted to a differential amplifier 91 to calculate the difference therebetween. Similarly, the output signals from the hold circuits 84 and 86 are inputted to a differential amplifier 92. The hold circuits 84 to 86 and differential amplifiers 90 to 92 compare the current signal with the signal sampled and held at the second preceding sampling pulse. This circuit arrangement has been adopted because, as seen from a photosensor output example shown in FIG. 7, it takes a time duration equal to approximately two drive pulses for the output signal to move from a space to a bar. The difference between the current and two-pulse-before signal becomes large so that the light measuring condition of the photosensor 13A can be reliably detected. In addition, the differential amplifiers 90 to 92 ensure a correct measurement even with variations of the intensity of the light source.

A multiplexer 94 is provided for selectively picking up the signals from the differential amplifiers 90 to 92. The multiplexer 94 is switched in response to the switching of the demultiplexer 83. The signal selected by the multiplexer 94 is sent to a window comparator 95 to be converted into two binary signals P1 and P2 which are supplied to CPU 45 synchronously with the drive pulses. The combinations of the values of the two binary signals P1 and P2 are used for judging black (bar) and white (space), as previously described. The window comparator 95 is constructed of a first comparator 96 supplied with a first reference voltage $V_H$ and a second comparator 97 supplied with a second reference voltage $V_L$. A potentiometer 100 is provided for setting the first voltage $V_H$ which is supplied via a buffer 101. The second voltage $V_L$ is supplied through a inverter amplifier 102 connected to the buffer 101.

Figure 7:
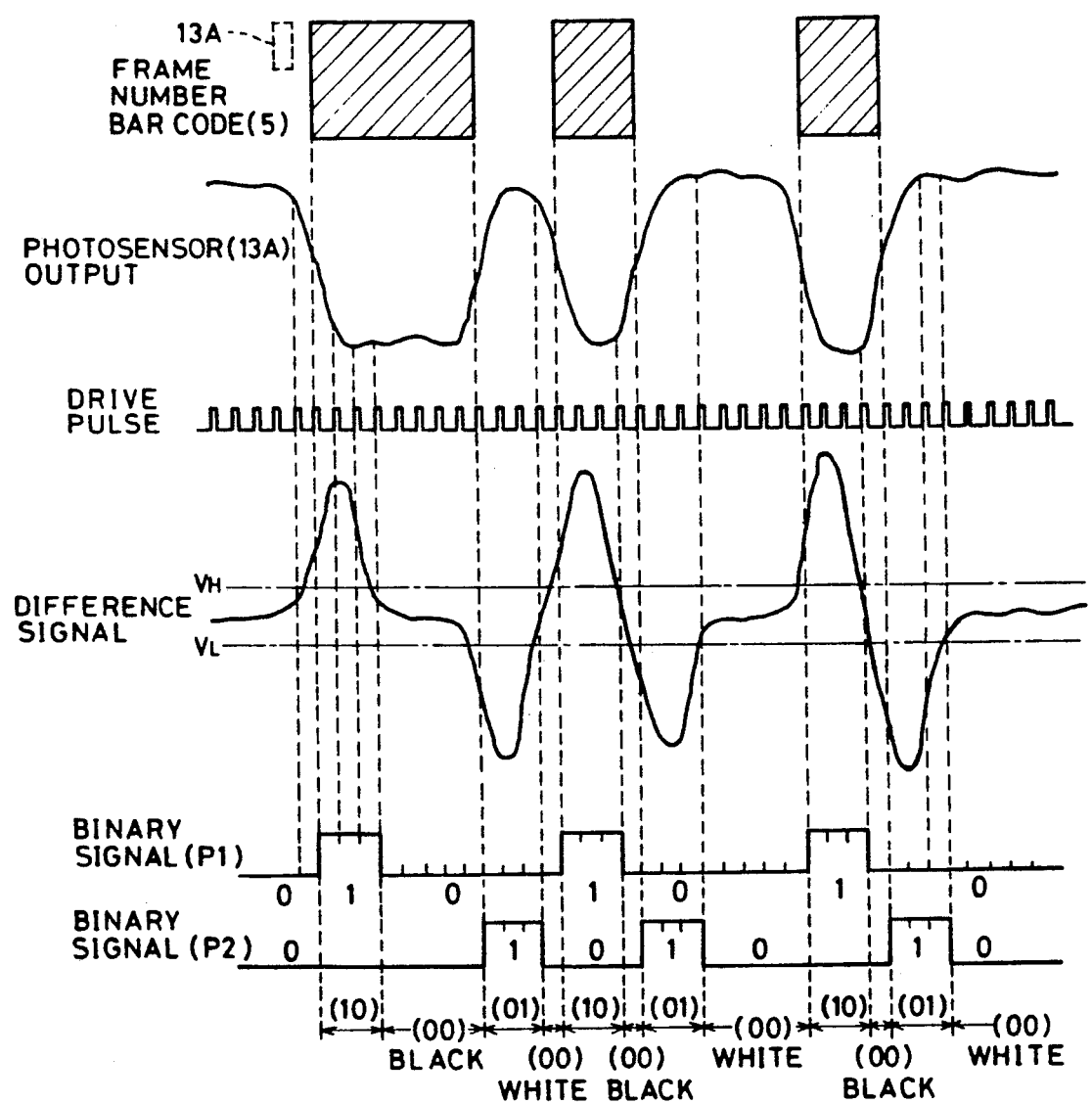
FIG. 7 shows waveforms at various parts of the signal processing unit shown in FIG. 6.

The waveforms at the signal processing circuit 40 are shown in FIG. 7. The photosensor 13B is connected to a circuit 104 having the same structure as that of the photosensor 13A.

Figure 8:
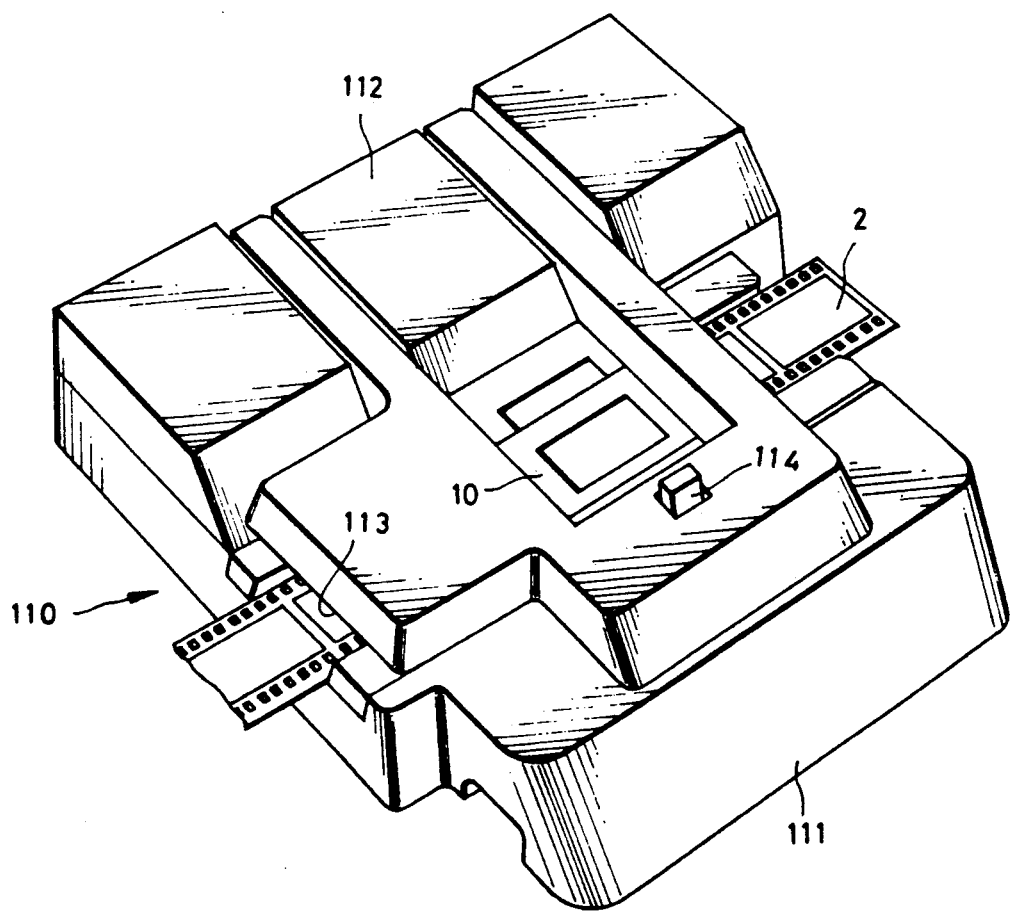
FIG. 8 is a perspective view of a film carrier.

FIG. 8 shows a film carrier 110 which is constructed of a carrier main body 111 and a lid member 112 pivotally coupled thereto. The carrier main body 110 has a film passage 113 formed therein and holds the lower rollers of the feed roller pairs 24 and 24. The lid member 112 holds the bar code sensor units 8 and 9, perforation sensor unit 11, film mask 10 and the upper rollers of the feed roller pairs 23 and 24. The lid member 112 is locked to the carrier main body 11 when the former is closed. Upon depression of a lock release knob 114, the lid member 112 is opened upwardly to expose the film passage 113 and allow the photographic film 2 to be set therein. The light sources are mounted facing the bar code sensor units 8 and 9 in the side of the film passage 113.

Figure 9:
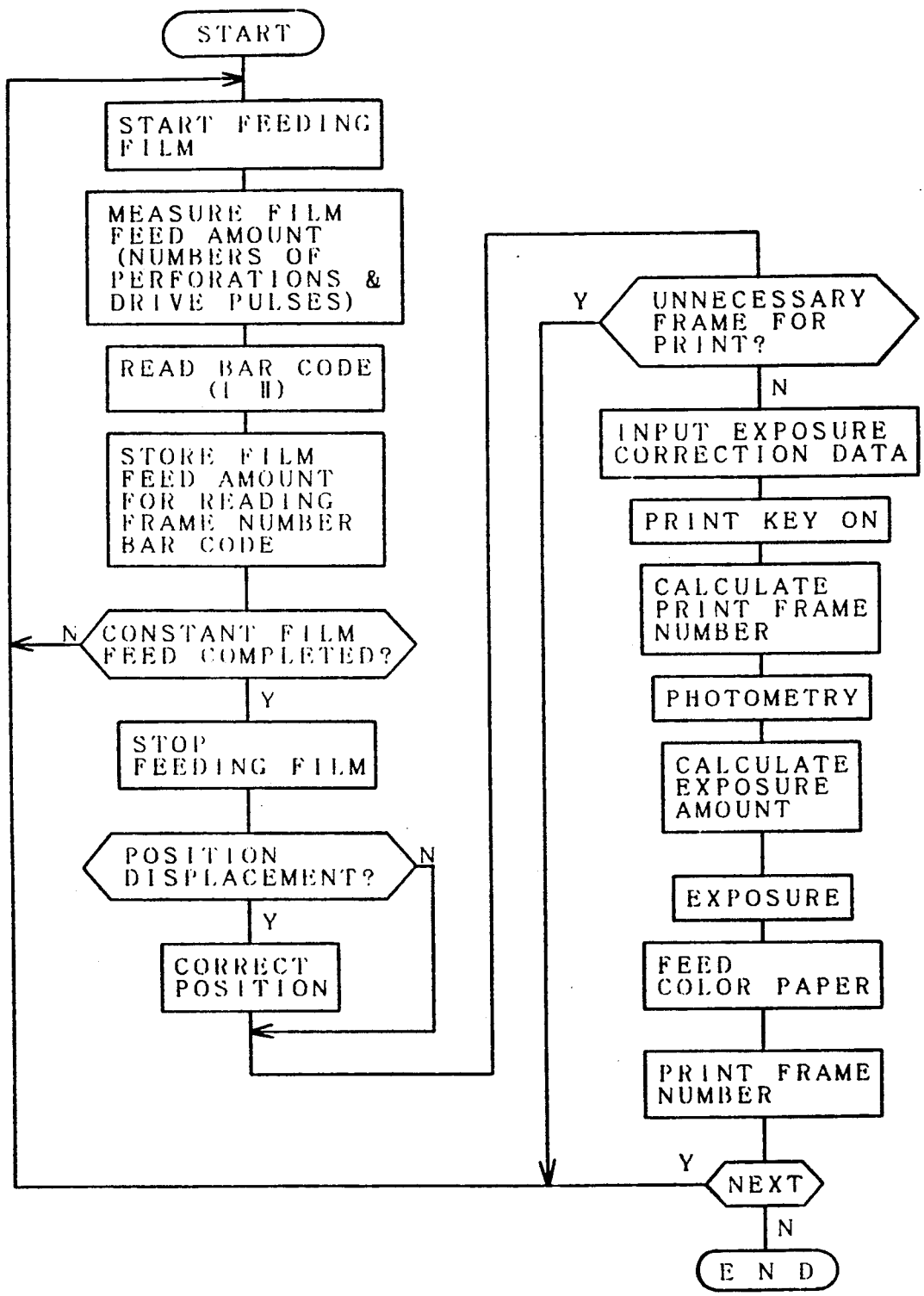
FIG. 9 is a flow chart showing a print procedure by the photographic printer shown in FIG. 4.

The operation of the foregoing embodiment now will be described with reference to FIG. 9. Upon opening the lid member 112 of the film carrier 110, the film mask 10 and the upper rollers of the two feed roller pairs 23 and 24 are retracted upwardly to expose the film passage 113. The photographic film 2 then is set on the film passage 113, and the lid member 112 is moved to the original position so that the perforation counter 48 is reset at that time. After loading the photographic film 2, a pass key 55 is operated to make CPU 45 output a signal representative of a forward rotation direction. This forward rotation signal is inputted to the perforation counter 48 and pulse counter 49 to place them in an addition count state.

CPU 45 outputs a predetermined number of drive pulses and sends them to the driver 47 to rotate the pulse motor 25 in the forward, or normal direction. As the pulse motor 25 rotates in the normal direction, the photographic film 2 is nipped with the two feed roller pairs 23 and 24 and is moved in the direction indicated by the arrow in FIG. 4 by one frame. The drive pulses also are supplied to the pulse counter 49, which counts them.

During the transportation of the photographic film 2, the perforation sensor unit 11 detects a perforation 3 and sends a detection signal to the perforation counter 48 and pulse counter 49. The perforation counter 48 which has been set in an addition count state, increments its content each time the detection signal in inputted thereto, to count the number of perforations 3. The pulse counter is reset each time the detection signal is supplied from the perforation sensor unit 11, to start and continue measuring the fine feed amount of the photographic film 2 until the next perforation 3 is detected. The feed amount "H" of the photographic film 2, using as a reference the time when the first perforation was detected, thus can be obtained by the following equation.

$$H = \alpha \times Pn + Dn \quad (1)$$

where "Pn" represents a count of the perforation counter 48, "Dn" represents a count of the pulse counter 40, and "α" represents the number of drive pulses corresponding to one pitch of the perforations 3. The film feed amount is represented using the number of drive pulses in this embodiment. However, it also may be represented by millimeters or inches.

During the transportation of the photographic film 2, the bar code sensors 8 and 9 read the corresponding frame number bar code 5 and DX bar code 6 while contacting the bar code and detecting transmitted light. The bar code reading procedure will be described with reference to FIG. 10. A signal outputted from the photosensor 13A is supplied to the current/voltage converter 70 in which it is converted into a voltage signal which then is amplified by the amplifier 76. The amplified signal is sent to the demultiplexer 83 and further is sent to a hold circuit. e.g., hold circuit 84 designated by the demultiplexer 83. Since the demultiplexer 83 sequentially and cyclically selects the hold circuits 84 to 86, the hold circuit 85 holds a signal sampled at the second preceding sampling pulse, whereas the hold circuit 86 holds a signal sampled at the first preceding sampling pulse. The output signals from the hold circuits 84 to 86 are sent to the differential amplifiers 90 to 92 to obtain a difference signal between a current signal and a two-pulse-before signal. With the circuit connection shown in FIG. 6, the differential amplifier 90 compares the current signal with a signal sampled and held at the second preceding sampling pulse so that the difference signal is outputted via the multiplexer to the window comparator 95.

Upon outputting a next drive pulse from CPU 45, the demultiplexer 83 and multiplexer 94 are switched to the hold circuit 85 at the trailing edge of the drive pulse. In this case, the difference signal from the differential amplifier 91 is selected and supplied to the window comparator 95. In the above manner, the difference signals from the differential amplifiers 90 to 92 are selectively picked up and sent to the window comparator as the difference signal shown in FIG. 7.

The window comparator 95 converts the difference signal into the two binary signals P1 and P2 using the two threshold values $V_H$ and $V_L$. If the combination of the values of the two binary signals P1 and P2 is (1, 0), it means that the light measuring state is changing from a space to a bar between consecutive light measurements. If the combination is (0, 1), it means that the light measuring state is changing from a bar to a space. If the combination is (0, 0), it means that a bar or space is just at the position of the photosensor 13A at both of the two light measuring timings. In view of the above in this embodiment, it is determined that the data (0, 0) changed from (1, 0) is black with an ample possibility since a bar is now under measurement, and it is determined that the data (0, 0) changed from (0, 1) is white with an ample possibility since a space is now under measurement. CPU 45 thus determined whether the data are for black or white and the judgment data are stored in the buffer memory 44, e.g., with "1" assigned to black and "0" assigned to white.

Similarly, a signal outputted from the photosensor 13B s converted into two binary signals P3 and P4 at the circuit 104 so that the black/white judgment result obtained therefrom is stored in the buffer memory 44. The black/white judgement result obtained using the other bar code sensor unit 9 is stored in a similar manner in the buffer memory 44.

Each time the photographic film 2 is fed by a predetermined distance, sampling is performed. If all the binary signals P1 to P4 are "0" after a predetermined number of samplings, then CPU 45 judges that all the bars have been read completely. Upon this judgement, CPU 45 reads the counts of the perforation counter 48 and the pulse counter 49. The number of pulses supplied from when the last bar was read up to the present time are obtained based upon the number of reading binary signal, i.e., the number of drive pulses, with reference to the buffer memory 44. The obtained number is then subtracted from the count of the pulse counter. Then, using this subtracted result and the count of the perforation counter 48 the film feed amount "H1" is calculated from the equation (1), the result being stored in RAM 63. If the subtraction result becomes a negative value, the count of the perforation counter 48 must be decremented by "1" and the number of drive pulses corresponding to one pitch of the perforations 3 must be decremented by the subtraction result.

After storing the film feed amount "H1" at the end of reading the bar code CPU 45 judges the data read with the two bar code sensor units 8 and 9 to determine whether they are the frame number bar code 5, DX bar code 6, or frame number 4, based on the read-out data format including the presence or absence of the data track, and the configuration of the start code or end code. If the data are determined to be the frame number 4, the buffer memory is reset to prepare for the next bar code reading.

If the data read with one of the sensor units are determined to be the frame number bar code 5, then the "N" sets of binary signal data stored in the buffer memory 44 at the first to N-th addresses are read out sequentially. The number N of binary signal data sets corresponds to the data within the data code area, which is 5 in the case of the frame number bar code shown in FIG. 7. Prior to reading the N binary signal data sets, it is determined whether the start data are for the start code or for the end code based on the length of black bar, i.e., the number of bits.

If it is determined that the frame number bar code 5 was read from the start code side, then the addresses at which the binary signal data sets are stored are used to sequentially read out the binary signal data sets from the buffer memory 44. Alternatively, if it is determined that the frame number bar code 5 was read from the end code side, then the addresses are used from the highest address to read the binary signal data sets in the reverse order to make the bits on the start code side to be the lowest bits.

Next, the length of black and white (number of bits) is judged to convert the length into a binary signal, with the longer set as "1" and the shorter one as "0", to generate the bar code data. The bar code data then are decoded, with reference to a frame number bar code data table stored in ROM 62, into a frame number which in turn is stored in RAM 63. Actually, the frame number decoded is a numerical value as shown in Table 1.

If it is determined that the DX bar code 6 has been read, then it is determined whether the DX bar code 6 was read from the start code or not. If the DX bar code was read from the end code, then the content in the buffer memory 44 is read in the reverse order. In reading out the DX bar code data from the buffer memory 44, those data read with the photosensor 13B or 14B are used to identify the addresses where the two binary signals change from (1, 0) to (0, 0). The DX bar code data read with the photosensor 13A or 14A then are read out from the buffer memory 44 at the above addresses. Consequently, the DX bar code 6 is detected while checking its data track status at the boundaries of the bar and space recorded on the clock track.

The bar code data are decoded, with reference to a DX bar code table stored in ROM 62, into a film type. The obtained film type (actually, a numerical value corresponding to the film type) is stored in RAM 63.

After storing the frame number and film type, the buffer memory 44 is reset to advance the reading the next bar code in the manner described above. The just read-out frame number and film type are replaced with the data previously read. At the same time, the film feed amount "H1" at the end of reading the bar code is replaced with a new one.

After completion of feeding the photographic film 2 by a predetermined amount, the pulse motor 25 is caused to stop. Thereafter, film inspection is carried out while monitoring it through the film mask 10. In the course of film inspection, it first is determined whether the first frame is correctly positioned at the print stage. If there is a shift in position alignment, the fine adjustment key 54a or 54b matching the shift direction is operated to rotate the pulse motor slowly in the forward or backward direction to correct the position of the frame. During this adjustment operation, since the perforation counter 48 and pulse counter 49 are set at the addition count state for the forward direction and at the subtraction count state for the backward direction, the counters 48 and 40 count up or down accordingly.

Next, it is determined whether the frame correctly aligned at the film mask 10 is to be printed or not. If the frame has no image therein, an out-of-focus image, or an extraordinary over exposure or under exposure image, then it is determined that it is not necessary to print the frame. For such an unnecessary frame, the pass key 55 is operated to feed one frame to perform position alignment for the second frame. For a frame that is to be printed, it is determined whether a subject failure occurs by the automatic exposure control. If it is anticipated that the subject failure will occur and that the finished print of a main object will have poor density and color, then the density correction key 56 and color correction key 57 are operated to input manually the exposure correction data.

After the frame inspection, the print key 59 is operated to make CPU 45 calculate the number of the frame to be printed. Upon operation of the print key 59, the counts of the perforation counter 48 and pulse counter 49 are read to calculate the film feed amount "H2" using the equation (1). In this embodiment, the film feed amount "H1" when the bar code sensor unit 8 detected the passage of the end bar 5b is stored in RAM 63, so that by obtaining a difference therebetween, the transportation amount "x" of the end bar 5b of the last read frame number bar code can be obtained.

Since the distance "L" from the center of the film mask 10 to the frame number is given by:

$$L = (a - x - e) \quad (2)$$

the number of frames "n" and the remainder "m" can be obtained by dividing L by the pitch "b" of frame numbers. Namely:

$$L/b = n \text{ with remainder "m"} \quad (3)$$

The remainder "m" corresponds to a distance from the frame number at the right side within the film mask 10 to the center thereof. Since the pitch "b" of the frame number is a constant value, the following equation stands, taking "M" as the distance from the frame number at the left side within the film mask 10 to the center thereof:

$$b = m = M \quad (4)$$

It is possible to know the frame number nearer to the center of the film mask 10 based on which value of "M" and "m" is larger or smaller. Specifically, taking "N" as the decoded numerical value of the read out frame number bar code, the decoded numerical value "Y" of the bar code of the frame number nearer to the center of the frame 2a becomes:

for m equal to or smaller than M $$Y = N - n \quad (5)$$

and for m larger than M $$Y = N - n - 1 \quad (6)$$

In the case where the photographic film 2 is transported from the film mask 10 to the bar code sensors 8 and 9, "+x" is used instead of "−x" in the above equations (2) and (6). In the case where the film feed amount is measured from the start bar 5a, "c" is used instead of "e". In the case where the frame number is larger at the film mask 10 side than at the bar code sensors 8 and 9 side, "+e" or "+c" are used instead of "−e" or "−c", and "+n" instead of "−n".

For the case shown in FIG. 1, assuming that a=90, b=15, x=3, e=8, and N=30, then $$L = 90 - 3 - 8 = 79$$

79/15 = 5 with remainder 4

Since 4 is smaller than 11, the values of "N" and "n" are substituted into the equation (4). The result is:

$$Y = 30 - 5 = 25$$

The frame number indicated by decimal number "25" of the decoded frame number bar code is "12". Therefore, it is determined that the frame of number "12" is positioned nearest to the center of the film mask 10.

After calculating the frame number and storing the frame number data in RAM 63, the exposure light amount is calculated by measuring light with the sensor 28. The obtained exposure light amount and the exposure correction data inputted through the keyboard 53 are used to calculate an exposure amount for each color. In accordance with the each exposure amount, the insertion amount of the color correction filters 18 to 20 into the optical path 21 is adjusted. After this adjustment, the shutter 31 is opened to expose light to the color paper 30.

After the exposure, the pulse motor 35 is rotated to feed the color paper 30 by one frame and set the unexposed portion at the exposure stage, with the color correction filters 18 and 20 being retracted to their normal positions. After the color paper 30 is fed, CPU 45 reads the frame number from RAM 63 and sends it to the decode driver 64. The decode driver 64 drives the character printer 37 to print the frame number "12" at the back of the exposed frame. In a similar manner, the frame number of each frame is read to make a print thereof, and the read-out frame number is printed at the back of the color paper 30.

Figure 11:
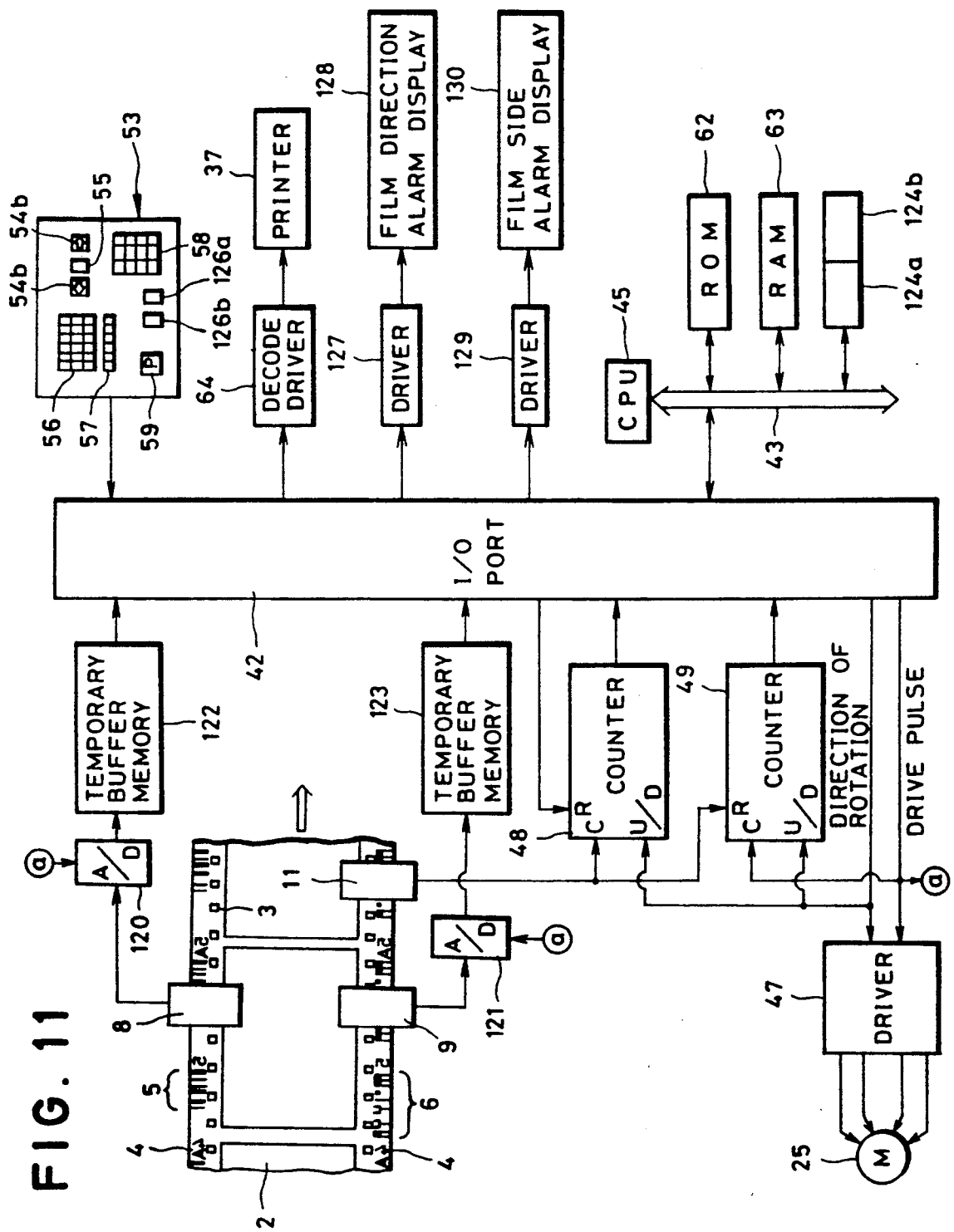
FIG. 11 is a block diagram of an electrical circuit whereby an alarm display is performed if a photographic film is set in a wrong direction or on a wrong side, according to another embodiment of this invention.

If the direction of the photographic film 2 is limited to one direction with respect to the film carrier 110, then the programs are simplified because it is not necessary to discriminate between the types of bar codes. In this case, if the wrong film direction is employed, the bar code cannot be read correctly. FIG. 11 is a block diagram showing an embodiment where if a wrong film direction is set, an alarm display is conducted. In FIG. 11, similar elements to those in FIGS. 1 to 8 are represented by using identical reference numerals, and accordingly the description thereof is omitted. In this embodiment, the discrimination between black and white bars is carried out by software under control of CPU 45. The bar code sensors 8 and 9 are connected to A/D converters 120 and 121. Each time the photographic film 2 is fed by a predetermined distance, signals outputted from the bar code sensors 8 and 9 are sampled, digitized and stored in temporary buffer memories 122 and 123. In this embodiment, digital conversion is carried out using as its sampling pulses the drive pulses for driving the pulse motor 25. The drive pulse, either frequency divided or multiplied, may be used as the sampling pulses, or the pulses outputted from a rotary encoder coupled to a free roller simultaneously rotating with the motion of the photographic film 2 also may be used as the sampling pulses for such digital conversion.

Data stored in the temporary buffer memories 122 and 123 are taken in CPU 45 which discriminates "black" and "white" states corresponding to the bar and space which the bar code sensor units 8 and 9 measured, to generate the black/white data. The black/white data for the bar code sensor unit 8 are written in a buffer memory 124a, and the black/white data for the bar code sensor unit 9 are written in a buffer memory 124b. CPU 45 judges the setting conditions of the photographic film 2 and the type of bar codes based on the white/black data, and decodes the white/black data.

The keyboard 53 is provided with film direction designating keys 126a and 126b. The film direction designating key 126a is used for the case in which the photographic film 2 is set at the film carrier 100 with the frame of smallest frame number positioned at the top. On the other hand, the film direction designating key 126b is used for the case in which the photographic film 2 is set at the film carrier 100 with the frame of largest frame number positioned at the top. Upon designation of the film direction, the type of bar codes read with the bar code sensor units 8 and 9, and also whether the bar code is read from the start code or from the end code can be identified. With the identified bar code type and reading direction given, it is possible to know the film direction and film side (i.e., whether it is set normally or in reverse). If the film direction is opposite to the designated one, the driver 127 drives a film direction alarm display 128. If the photographic film is set in reverse, the driver 129 drives a film side alarm display 130. Lamps, buzzers, liquid crystal display panels, or the like may be used as the alarm displays 128 and 130. If the liquid crystal panel is used, the alarm displays 128 and 130 may be integrated in a single unit.

Figure 12:
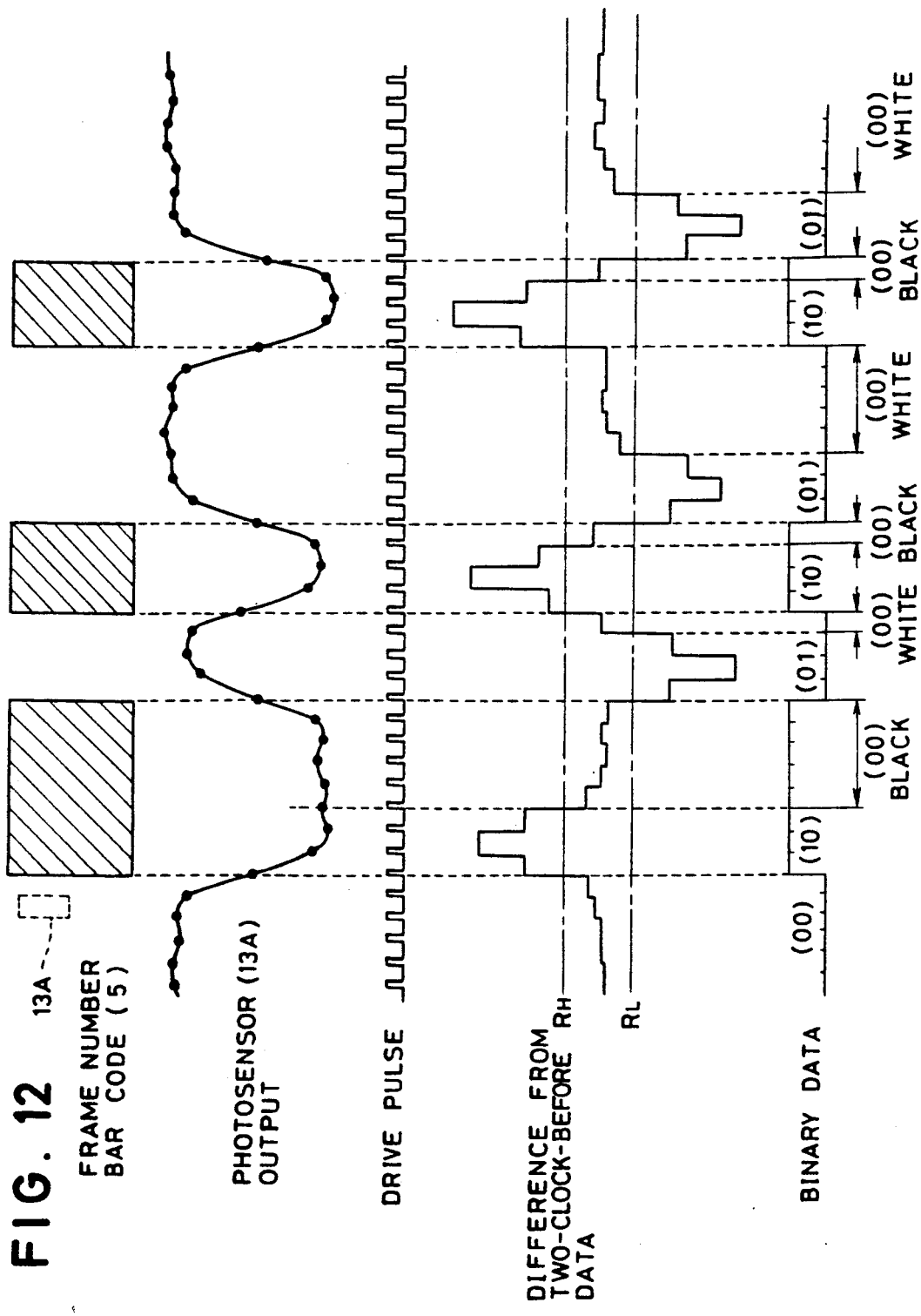
FIG. 12 shows waveforms for producing binary data by the circuit shown in FIG. 11.

FIG. 12 illustrates output waveforms of the photosensor and binary data generated by the CPU. As the photographic film 2 is fed, the photosensor 13A generates photocurrent in accordance with a measured bar or space. The photocurrent is sampled and quantized at A/D converters 120 and 121 synchronously with the drive pulses, and the obtained data are compared with the data at the second preceding drive pulse to obtain a difference therebetween. If the difference is higher than a first level "Rh", it is converted into binary data (1, 0); if it is lower than a second level "Rl", it is converted into binary data (0, 1); and if it is between the two levels, it is converted into binary data (0, 0).

Figure 13:
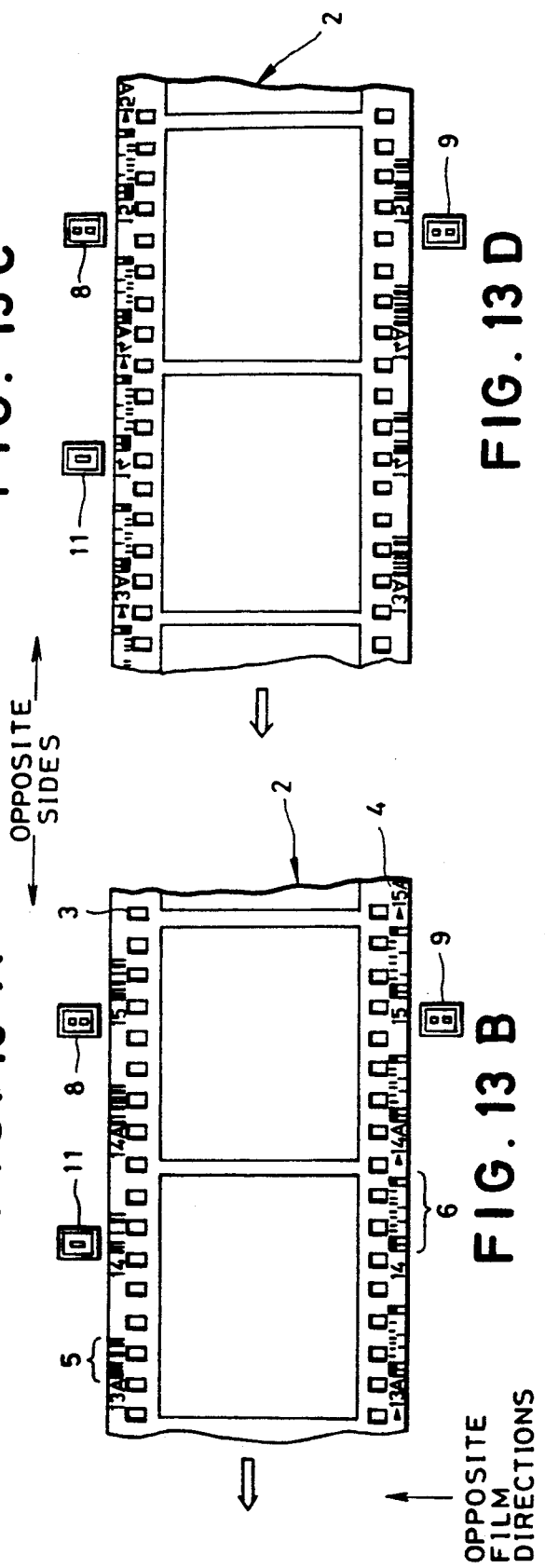
FIGS. 13A to 13D illustrate setting conditions of a photographic film.
Figure 14:
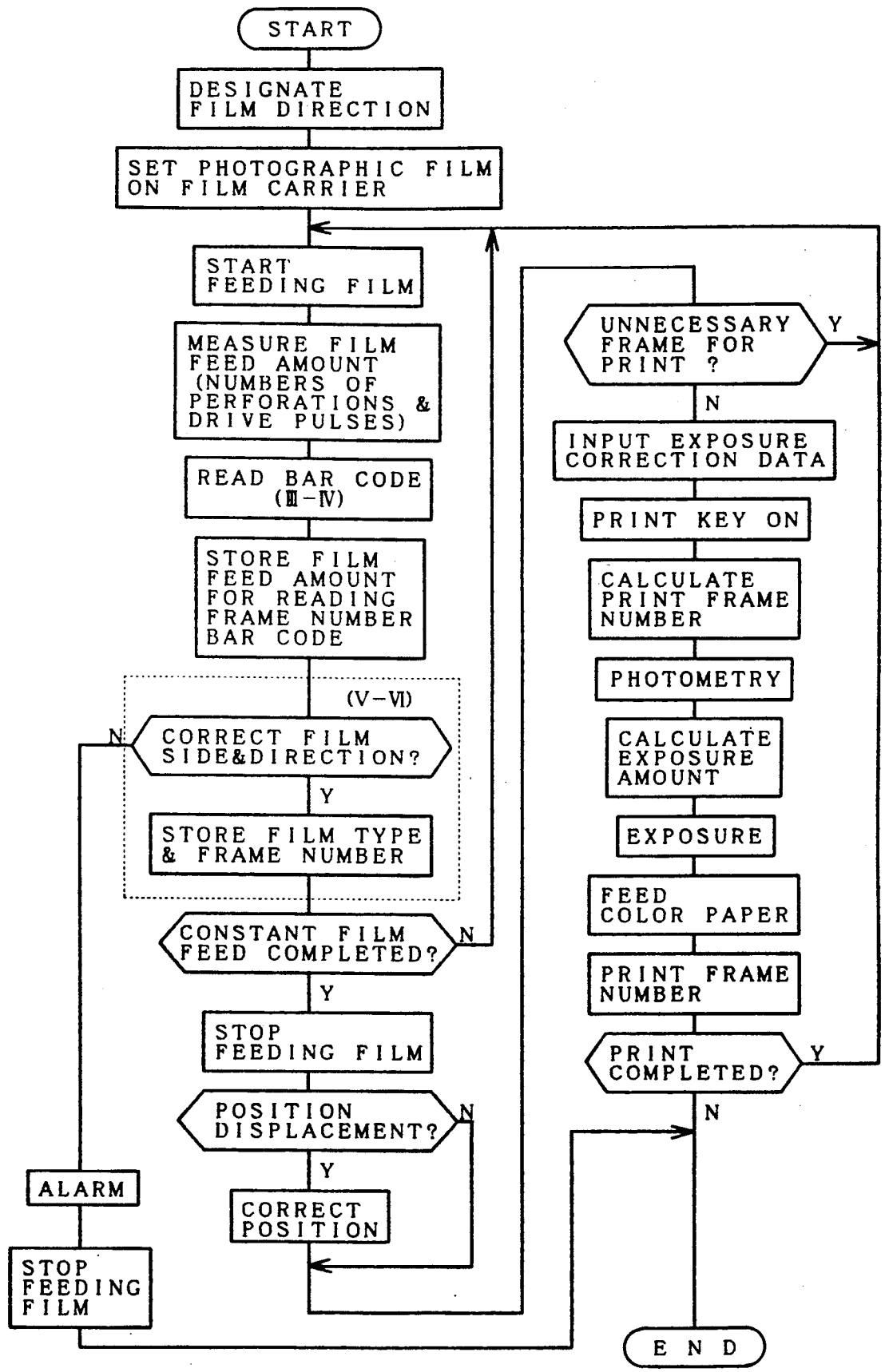
FIG. 14 is a flow chart showing the print procedure according to the embodiment shown in FIG. 11.
Figure 15:
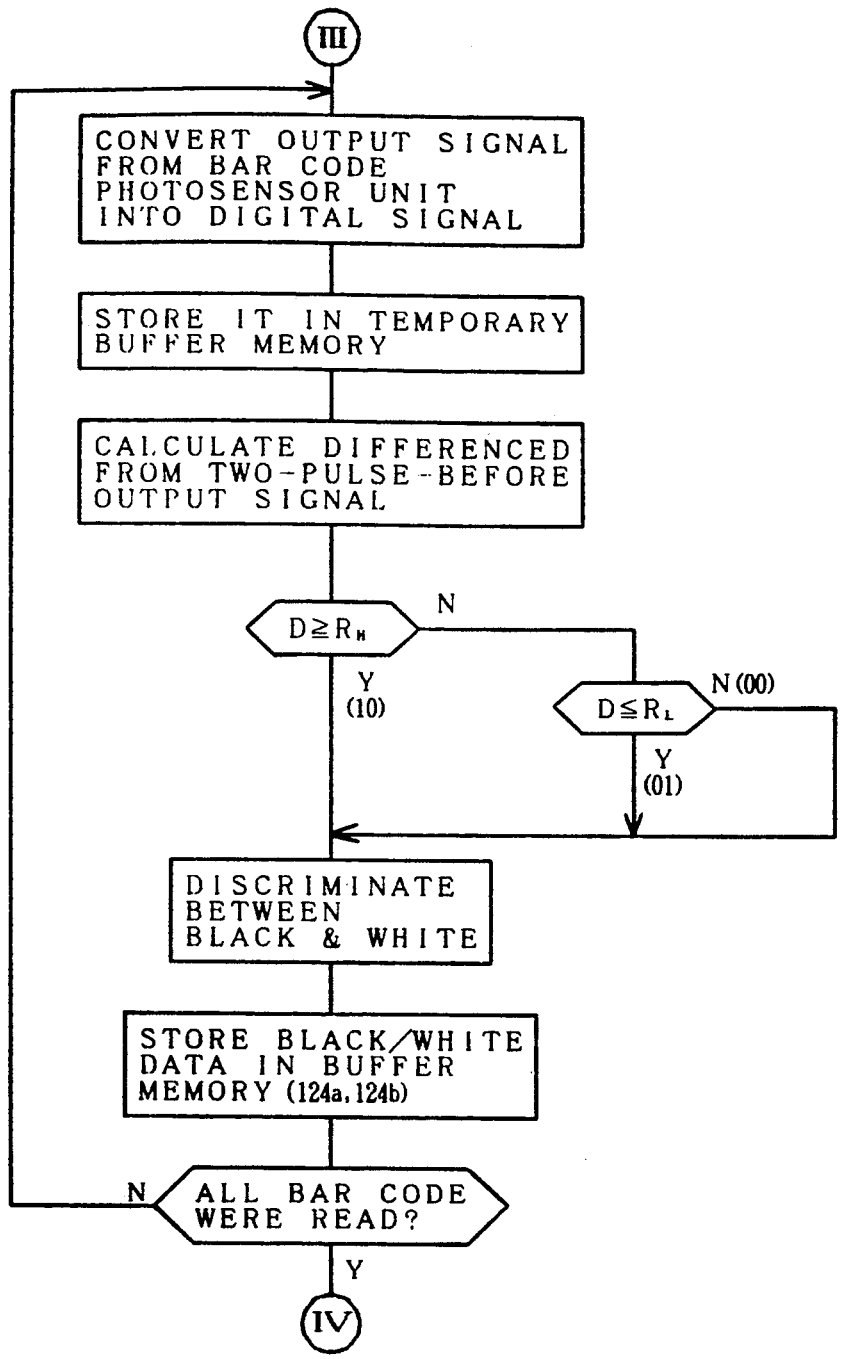
FIG. 15 is a flow chart showing the detail of the bar code reading procedure shown in FIG. 14.

Next, the operation of the above embodiment will be described briefly with reference to FIGS. 13 to 16. First, using the keyboard 53, the direction of the photographic film 2 is designated. For instance, as shown in FIG. 13A, if the photographic film is to be set with the frame of a smaller frame number positioned at the top, the film direction designating key 126a is actuated. Next, the photographic film 2 is set as above to start feeding it. As the photographic film 2 is fed, the bar code sensor units output two types of different signals which are digitized and stored in the temporary buffer memories 122 and 123, respectively. The data from the photosensor 13A stored in the temporary buffer memory 122 are read by CPU 45 to calculate a difference from the data at the second preceding drive pulse. As shown in FIG. 12, the difference is converted into binary data so that the discrimination between black and white is conducted based on the time domain history of binary data as described with reference to the first embodiment. The obtained black/white data are stored in the buffer memory 124a. Similarly, the data from the photosensor 13B are read from the temporary buffer memory 122 and converted into black/white data which are stored in the buffer memory 124a. The data read from the temporary buffer 123 are subject to similar black/white discrimination, and the obtained black/white data are stored in the buffer memory 124b.

Figure 10:
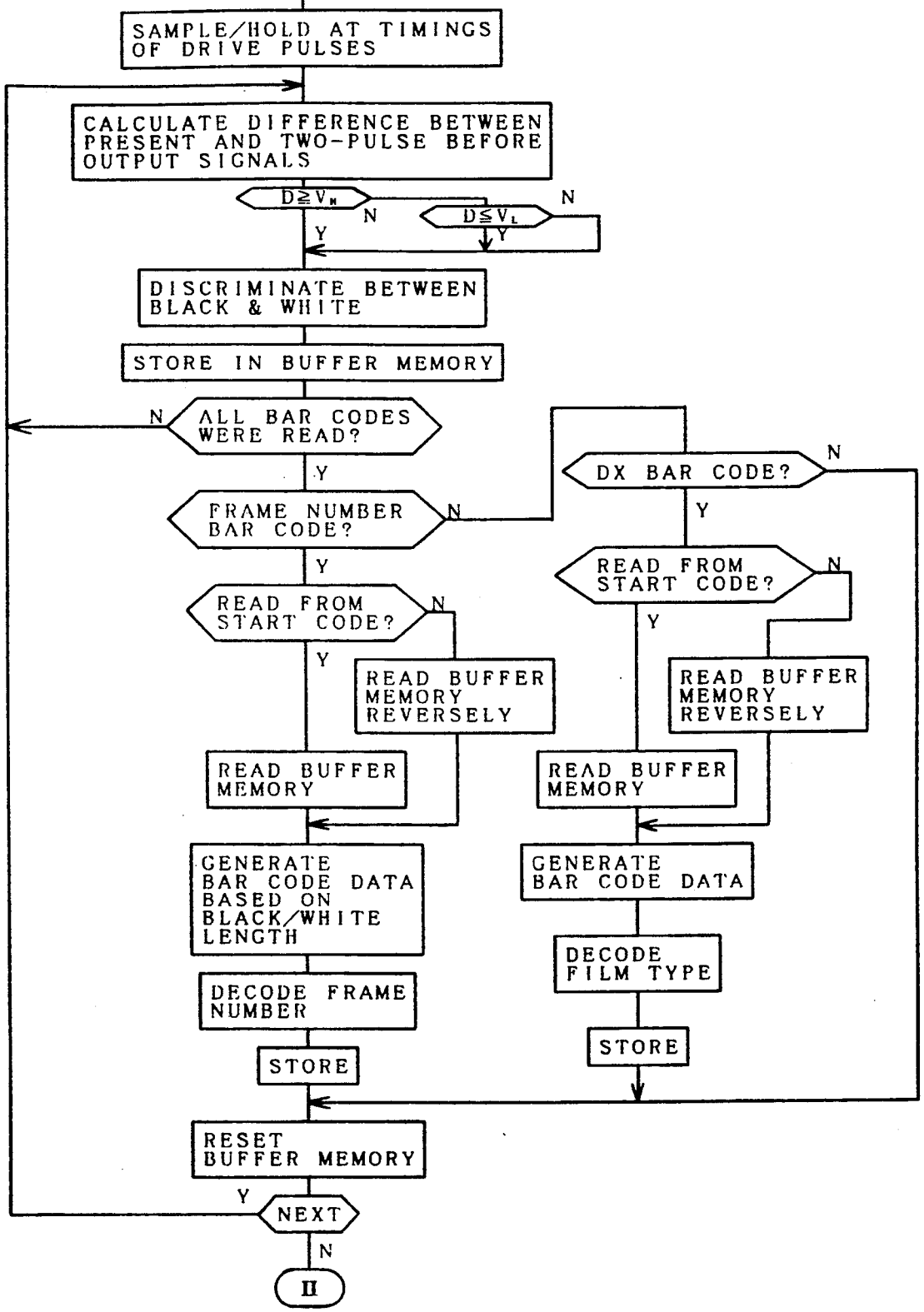
FIG. 10 is a flow chart showing the detail of the bar code reading procedure shown in FIG. 9.

After it is confirmed in accordance with the procedure described with respect to FIG. 10 that the bar code reading has been completed, CPU 45 determines whether the data read with the bar code sensor unit 8 are for the designated bar code based on the stored data. This judgement can be conducted based on whether there is a data track or not, or whether there is a start code or an end code. In this embodiment, since the direction of the photographic film is assumed as designated as shown in FIG. 13A, it is determined whether the bar code sensor 8 reads the frame number bar code 5. If so, then it is determined whether the data was read from the start code. If the data were read from the end code, the photographic film 2 was set as shown in FIG. 13D so that the film direction alarm display 128 and film side alarm display 130 output alarms accordingly, and the pulse motor 25 is stopped to forcibly stop feeding the photographic film 2.

If the bar code sensor unit 8 reads the DX bar code 6, it is determined whether the data were read from the start code or not. If yes, the photographic film 2 was set as shown in FIG. 13C so that the film side alarm display 130 outputs an alarm accordingly, and the photographic film reading is stopped. If the data were read from the end code, the photographic film 2 was set as shown in FIG. 13B so that the film direction alarm display 128 outputs an alarm.

For the wrong film direction and side, the lid member 112 of the film carrier 100 is opened to set the photographic film 2 correctly in accordance with the alarm display. For the wrong film direction, the film direction designating key 126b may be actuated, and the pass key 55 is operated to restart the film feeding. If the data read with the bar code sensor unit 8 are neither the frame number bar code 5 nor the DX bar code 6, it is judged that the bar code sensor unit read the frame number 4, and the buffer memories are reset to prepare for reading the following bar code.

If the film direction and side are correct, the bar code sensor unit 8 has read the frame number bar code 5 from the start code thereof, and the bar code sensor unit 9 has read the DX bar code 6 from the start code thereof. As previously described, the bar code data are generated and converted into the frame number and film type with reference to ROM 62.

After storing the film number or film type in RAM 63, the buffer memories 124a and 124b are reset to read the next bar code in the manner described above. Thereafter, the frame number bar code 5 and DX bar code 6 are read in a similar manner so that the obtained frame number and film type are replaced with the old data and stored. At the same time, the film feed amount "H1" at the end of reading the frame number is replaced with a new one.

Figure 16:
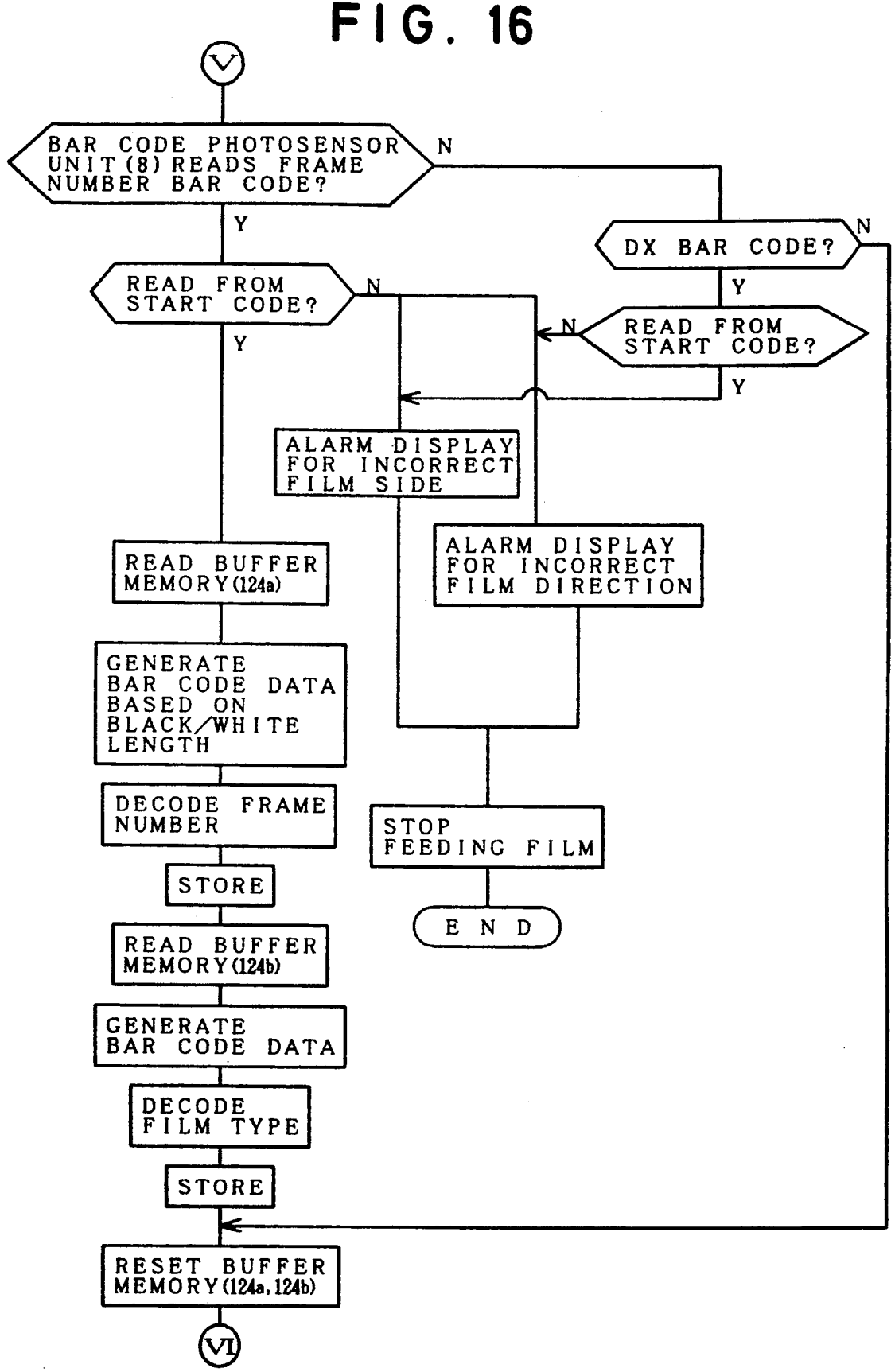
FIG. 16 is a flow chart showing the detail of the discrimination procedure for frame number and film type shown in FIG. 14.
Figure 17:
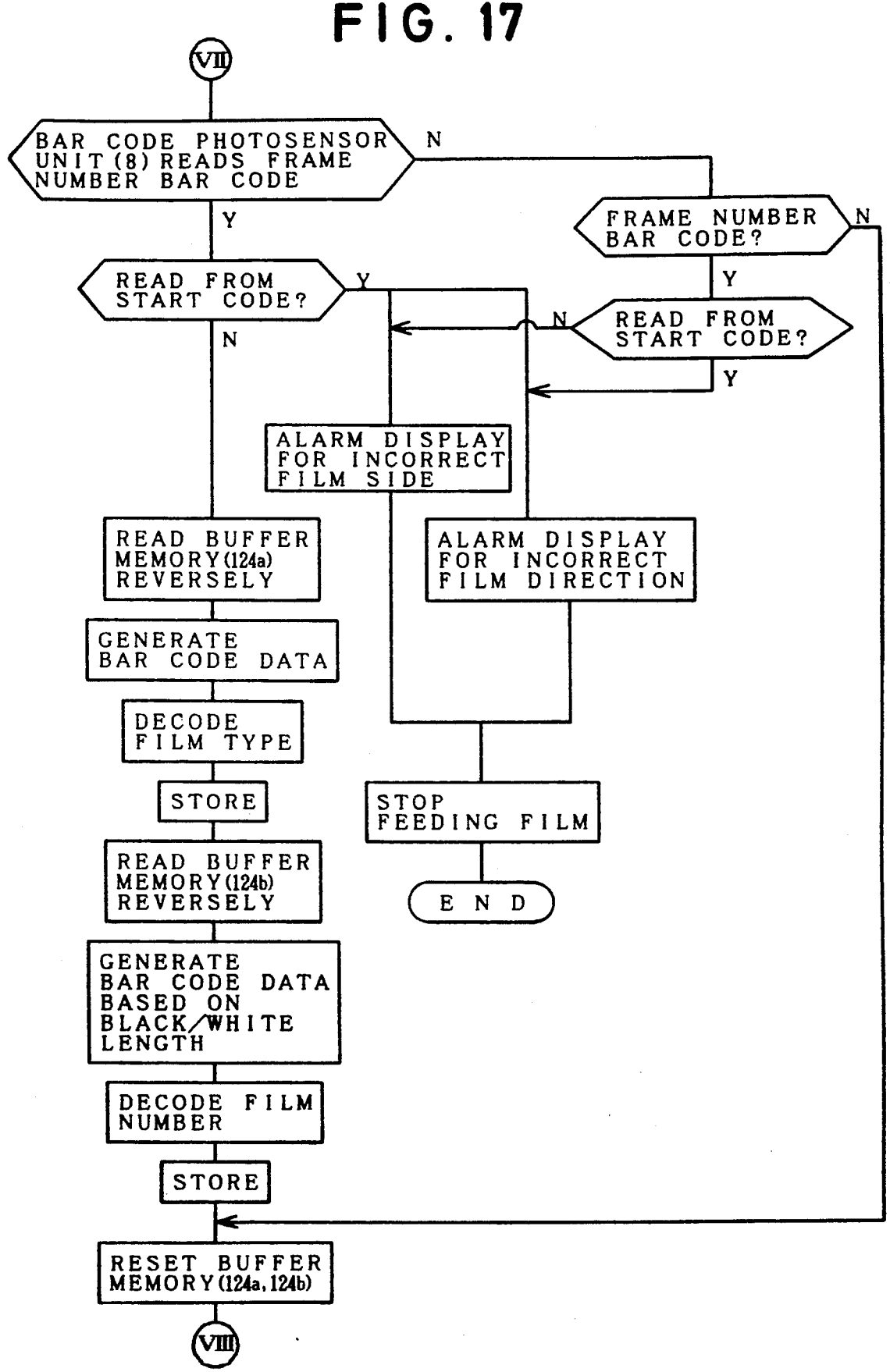
FIG. 17 is a flow chart showing the discrimination procedure for frame number and film type when a film direction is changed.

If the photographic film 2 is set with the frame of larger number positioned at the top, the procedure shown in FIG. 17 is used instead of FIG. 16. In this case, the film direction designating key 126b of the keyboard 53 is actuated. Only for the case where the photographic film 2 is set as shown in FIG. 13A, the bar code sensor units 8 and 9 can read the frame number bar code 5 and DX bar code 6. For the other cases, an alarm display is effected by means of the film direction alarm display 28 and film side alarm display 130. In these cases, since the data are read from the end code, the black/white data in the buffer memories 124a and 124b are read in reverse order from a larger address to a smaller address to obtain the frame number and film type.

Figure 18:
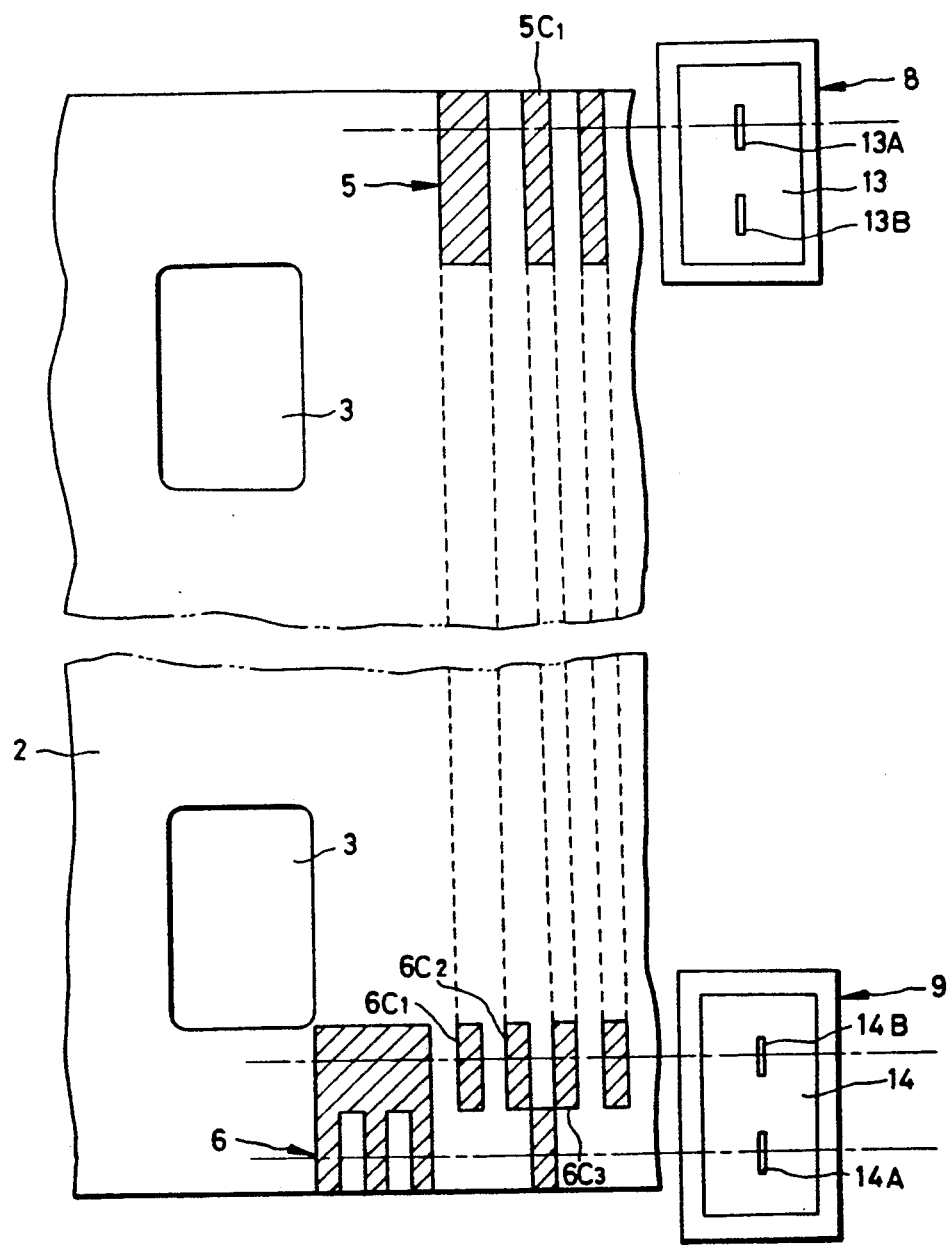
FIG. 18 is a view similar to FIG. 3 illustrating the method of reading a frame number bar code using the clock track of a DX bar code according to this invention.

As shown in FIG. 18, if the frame number bar code 5 is recorded in positional correspondence to the DX bar code 6, then it is possible to readily read the frame number bar code using the clock track of the DX bar code 6. Specifically, the edge of the first clock bar 6C1 recorded on the data code area of the DX bar code 6 coincides in position with one edge of the start bar 5a of the frame number bar code 5. The edge of the second clock bar 6C2 coincides in position with the other edge of the start bar 5a. Similarly, the edge of the clock bar 6C3 coincides with the edge of the data bar 5C1. Thus, it is possible to read the frame number bar code 5 using the clock track of the DX bar code 6. Even if such positional coincidence between two bar codes is not present, the bar code sensor unit 8 may be mounted where the positional difference can be eliminated so that the frame number code can be read using the clock track of the DX bar code 6. Such a reading method shown in FIG. 18 also is applicable to the embodiments shown in FIGS. 5 and 11.

FIG. 19 is a block diagram showing an example of a circuit used for reading the frame number bar code with the aid of the clock track. In this embodiment, since the film direction is limited to one direction, the photosensor 14B of the bar code sensor unit 9 reads the signals recorded on the clock track of the DX bar code 6. Signals outputted from the photosensor 14B are differentiated at a differentiation circuit 136. Sampling circuits 135 and 140 perform sampling operations synchronously with the obtained differentiated signals. The sampling circuit 135 samples a signal outputted from the photosensor 13A. That signal is binarized at a binarization circuit 137 and stored in a buffer memory 138. A series of binary signals stored in the buffer memory 138 are decoded at a decoder 139 into frame number data. Similarly, a signal outputted from the photosensor 14A is subject to the circuit constructed of a binarization circuit 141, buffer memory 142, and decoder 143. In order to read both the DX bar code 6 and frame number code 5, the photosensors 13B and 14B are connected to the differentiation circuit 136 via an OR gate so that the type of bar codes is discriminated based on a difference of code patterns as described previously.

In the embodiment shown in FIG. 11, the direction of the photographic film 2 can be selected by the film direction designating keys 126a and 126b. However, to simplify the structure, the film direction keys may be omitted and the film direction is fixed at one particular direction. In this case, the type of bar codes read with the bar code sensor units 8 and 9, and the reading direction are fixed so that the reading and decoding procedure becomes simple. The film direction and film side are arranged to alarm an error independently. However, the same alarm may be used in common for both the film direction and film side to simplify the alarm procedure. For the embodiment shown in FIG. 5 wherein reading is allowed irrespective of film direction, an alarm only for a wrong film side is performed. The determination of the setting conditions of the photographic film also is applicable to photographic films now available in the market with only DX bar codes printed.

Further, in order to perform photographic printing efficiently. the photographic film 2 may be fed first in one direction to perform a film inspection for each frame (position setting, exposure amount calculation) and frame number reading, and then the photographic film 2 is fed in the opposite direction to position each frame automatically and consecutively perform photographic printing based on the position data obtained by the film inspection.

The present invention is applicable not only to a photographic printer, but also to a frame image inspection apparatus for manually determining an exposure correction amount.

It will, of course, be understood that various changes and modifications may be made without departing from the scope of the present invention. Thus, the invention is to be considered as limited only by the scope of the appended claims.

We claim:

1. An apparatus for reading a DX bar code recorded on one side of a photographic film and a frame number bar code recorded on the other side edge, said apparatus comprising:

two bar code sensor units for sensing said DX bar code and said frame number bar code and being disposed respectively on opposite sides of a passage of said photographic film, each said bar code sensor unit being provided with two photosensors juxtaposed along a line perpendicular to a lengthwise direction in which said photographic film is transported, said two bar code sensor units having the same structure;

sampling means for sampling, at the same time, a plurality of types of signals outputted respectively by said photosensors, said sampling being performed each time said photographic film is transported by a predetermined distance;

binarization means for receiving said signals sampled by said sampling means and providing a binary representation thereof;

means for automatically discriminating the data of said DX bar code and frame number bar code read with said two bar code sensor units, based on the data configuration, and obtaining a film type from said discriminated DX bar code data and a frame number from said frame number bar code data;

means for measuring the feed amount of the read-out frame number bar code, from a reference position which is a mounting position of said bar code sensor unit, said feed amount being a distance said film has been fed between successive frame number bar codes;

means for obtaining a distance to the center of a film mask from the read-out frame number bar code or associated printed frame number, based on said measured feed amount; and means for obtaining a number of frames by dividing said distance by a distance between consecutive ones of said frame number bar codes or associated printed frame numbers, and calculating the frame number of a frame set at said film mask, based on said number of frames and said read-out frame number.

2. An apparatus according to claim 1, wherein said feed amount measuring means comprises:

a perforation sensor for detecting a perforation of said photographic film;

a first counter for counting an output signal from said perforation sensor; and a second counter for counting a drive pulse used in feeding said photographic film, said second counter being reset synchronously with each count operation by said first counter, whereby said feed amount of said read-out frame number bar code is measured based on the number of perforations and the number of drive pulses.

3. An apparatus for reading a DX bar code recorded on one side edge of a photographic film and a frame number bar code recorded on the other side edge, said apparatus comprising:

two bar code sensor units disposed respectively on opposite sides of a passage of said photographic film, each said bar code sensor unit being provided with two photosensors juxtaposed along a line perpendicular to a lengthwise direction in which said photographic film is transported;

sampling means for sampling, at the same time, a plurality of types of signals outputted respectively by said photosensors, said sampling being performed each time said photographic film is transported by a predetermined distance;

binarization means for receiving said signals sampled by said sampling means and providing a binary representation thereof;

means for automatically discriminating the data of said DX bar code and frame number bar code read with said two bar code sensors, based on the data configuration, and obtaining a film type from said discriminated DX bar code data and a frame number from said frame number bar code data;

means for measuring the feed amount of the read-out frame number bar code, from a reference position which is a mounting position of said bar code sensor unit, said feed amount being a distance said film has been fed between successive frame number bar codes;

means for obtaining a number of frames by dividing said distance by a distance between consecutive ones of said frame number bar codes or associated printed frame numbers, and calculating the frame number of a frame set at said film mask, based on said number of frames and said read-out frame number;

wherein said feed amount measuring means comprises a perforation sensor for detecting a perforation of said photographic film, a first counter for counting an output signal from said perforation sensor, and a second counter for counting a drive pulse used in feeding said photographic film, said second counter being reset synchronously with each count operation by said first counter, whereby said feed amount of said read-out frame number bar code is measured based on the number of perforations and the number of drive pulses, wherein said sampling is performed in synchronism with drive pulses supplied to a pulse motor which transports said photographic film.

4. An apparatus according to claim 3, wherein each of said photosensors is fabricated on an amorphous silicon substrate.

5. An apparatus according to claim 4, wherein said binarization means comprises:

means for obtaining a difference signal between a current sampled signal and a signal sampled at a second preceding sampling timing; and data conversion means for converting said difference signal into (1, 0) data if said difference signal is larger than a first reference level, into (0, 1) data if said difference signal is lower than a second reference level, or into (0, 0) data if said difference signal is between said first and second reference signal levels.

6. An apparatus according to claim 5, wherein said data conversion means comprises a window comparator.

7. An apparatus according to claim 5, wherein (0, 0) data produced after (1, 0) data are judged as being a bar, and (0, 0) data produced after (0, 1) data are judged as being a space.

* * * * *